United States Patent [19]

Sable et al.

[11] Patent Number: 5,645,862
[45] Date of Patent: Jul. 8, 1997

[54] APPARATUS FOR THE THERMAL DENSIFICATION OF THERMOPLASTIC ARTICLES

[75] Inventors: Lewis E. Sable, Rochester; Richard A. Wenzel, Pittsford, both of N.Y.

[73] Assignee: Tenneco Plastics Company, Evanston, Ill.

[21] Appl. No.: 533,805

[22] Filed: Sep. 26, 1995

Related U.S. Application Data

[63] Continuation-in-part of Ser. No. 210,268, Mar. 17, 1994, Pat. No. 5,470,521, and a continuation of Ser. No. 991,725, Dec. 15, 1992, abandoned, which is a continuation of Ser. No. 775,621, Oct. 10, 1991, abandoned, which is a continuation-in-part of Ser. No. 476,087, Feb. 7, 1990, abandoned.

[51] Int. Cl.[6] .................................................. B29C 35/02
[52] U.S. Cl. ........................... 425/73; 425/135; 425/144; 425/445; 222/146.2
[58] Field of Search ................................ 425/143, 144, 425/DIG. 46, 73, 135, DIG. 13, 383, 445; 222/146.2

[56] References Cited

U.S. PATENT DOCUMENTS

| | | | |
|---|---|---|---|
| 3,344,212 | 9/1967 | Francis | 425/DIG. 46 |
| 3,752,631 | 8/1973 | Corbett et al. | 425/456 |
| 3,830,616 | 8/1974 | Hawkins | 425/143 |
| 4,254,068 | 3/1981 | Otsuka | 425/DIG. 46 |
| 4,767,299 | 8/1988 | Friesen | 425/135 |
| 4,821,922 | 4/1989 | Miller et al. | 222/146.2 |
| 4,919,308 | 4/1990 | Majkrzak | 222/146.2 |
| 5,470,521 | 11/1995 | Wenzel et al. | 264/321 |
| 5,489,200 | 2/1996 | McGraw et al. | 425/144 |

*Primary Examiner*—Allan R. Kuhns
*Attorney, Agent, or Firm*—Arnold, White & Durkee

[57] ABSTRACT

An apparatus for thermally densifying thermoplastic articles, particularly those of the expendable type. The apparatus includes a thermally insulated cabinet having mounted within a two-section hopper and a convection heating system. The apparatus is adapted for heating the thermoplastic articles placed within the chamber to a temperature effective for the thermal densification of the thermoplastic articles. The convection heating system creates a circulating air flow between the hopper and the cabinet walls. The air flow insulates the hot hopper from the apparatus cabinet and densifies the thermoplastic articles. The apparatus also renders any food particles in or on the thermoplastic articles bacterially inert.

8 Claims, 20 Drawing Sheets

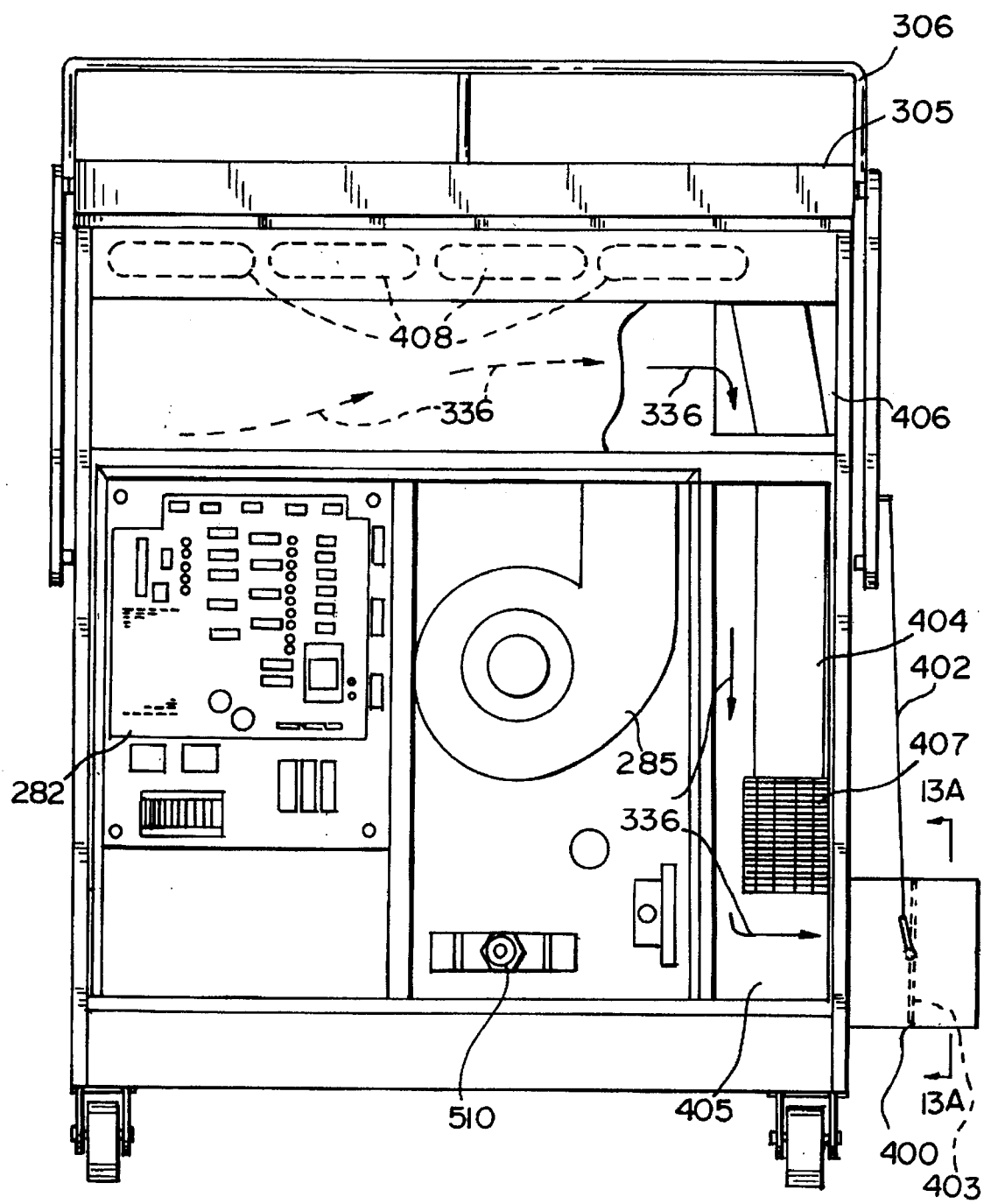
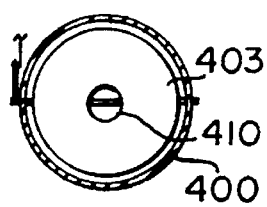
FIG. 13
FIG. 13A

APPARATUS FOR THE THERMAL DENSIFICATION OF THERMOPLASTIC ARTICLES

RELATED APPLICATIONS

This application is a continuation-in-part of application Ser. No. 08/210,268, now U.S. Pat. No. 5,470,521, filed on Mar. 17, 1994, the contents of which are hereby incorporated by reference in its entirety, which is a continuation of application Ser. No. 07/991,725, now abandoned, filed on Dec. 15, 1992, which is a continuation of application Ser. No. 07/775,621, filed on Oct. 10, 1991, now abandoned, which is a continuation-in-part of application Ser. No. 07/476,087, filed on Feb. 7, 1990, now abandoned.

FIELD OF THE INVENTION

The present invention relates to an apparatus for increasing the bulk density of discarded thermoplastic articles. More particularly, this invention relates to an apparatus employing a thermal process to densify discarded thermoplastic articles and to render food remains attached to such thermoplastic articles bacterially inert.

BACKGROUND OF THE INVENTION

Although expendable thermoplastic packaging is preferred by suppliers and consumers alike for many applications, many people are now concerned over the disposal of such packaging as landfill space becomes increasingly scarce. Packaging materials and containers make up approximately 30 percent of our municipal solid waste stream with packaging produced from thermoplastics accounting for approximately 13 percent of those packaging materials and containers. Greater emphasis is now being placed on the recycling of packaging materials as an important means of reducing our solid waste load.

A significant economical problem exists in the collection of plastic packaging of low bulk density. For example, the typical blow-molded one gallon milk bottle produced from high density polyethylene (HDPE) weighs only 60 grams yet occupies a volume in excess of 230 cubic inches. This equates to a bulk density on the order of less than 1 lb/ft$^3$, whereas HDPE in solid block form has a density of approximately 60 lbs/ft$^3$. This difference is even more pronounced for packaging produced from foamed polystyrene where container bulk densities on the order of 0.25 lb/ft$^3$ are typical even though the density of the polystyrene in solid block form is approximately the same as that of HDPE. Newly made foamed polystyrene food containers nested in stacks weigh about 4 to 6 lbs/ft$^3$ which is as dense as the product can be made without destroying its intended use. It is difficult to get discarded material this dense even with some compaction. As such, it is generally not economically feasible for the recycler to pick up discarded containers from consumers or businesses without some form of incentive to do so. The plastic food packaging that often contains food residue poses further problems.

The landfill disposal of thermoplastic packaging is also impacted to some extent by low bulk density. Although the problem at the landfill is certainly lessened by the fact that the thermoplastic articles are greatly compacted by the weight of compacting equipment and of subsequently disposed loads, they contribute to the volume of waste in the landfills and add to the cost of collecting and hauling such articles to the disposal site.

An industry which has seen a rapid increase in the use of thermoplastic packaging is the fast-food industry. Thermoplastic packaging offers many highly desirable characteristics and good economic value. Foamed polystyrene is used to form serving trays, hot drink cups, sandwich containers, containers for segregated hot and cold food, and compartmentalized hot food containers. A typical fast-food restaurant may use approximately 20 pounds of foamed polystyrene packaging per day. This small weight is still noteworthy given the fact that the typical sandwich container weighs less than 6 grams or approximately 1/100 of a pound. Even if it is assumed that one-half of this packaging material is taken off the premises of the restaurant in the form of carry-out items, a significant bulk volume of material (an equivalent of more than 750 sandwich containers) is left on site for disposal by the restaurant each day. Although the volume of material that must be handled in this case is quite large, the weight of recoverable polystyrene material is exceedingly small. If such a restaurant were to sell its recovered thermoplastic material to a recycler, the cost of collecting and transporting this material could easily exceed its value.

An added problem is that much of the post-consumer thermoplastic containers have residual food waste present on their inner walls. Without very quick collection and recycling, bacterial activity can present a health problem. This complicates the collection process at many locations where very low tonnage is discarded each day. The shear volume due to the low bulk density and the need to move the material to avoid health and safety issues make accumulating economical amounts for recycling prohibitive.

Another problem area is the disposal of thermoplastic waste at sea. At sea, waste materials are often collected and disposed of by dumping overboard. While much of the waste will decompose with time, or sink to the bottom of the sea, thermoplastic packaging materials generally do neither and eventually wash up on shore. The problems associated with collecting and storing low bulk density material at sea are more acute because of the limited space available for such tasks.

Therefore what is needed to address the disposal problems associated with thermoplastic packaging and containers of low bulk density is an apparatus and method for densifying these discarded thermoplastic articles and for rendering any food remains on these articles bacterially inert.

SUMMARY OF THE INVENTION

According to the present invention, there is provided an apparatus for thermally densifying thermoplastic articles comprising a chamber for placing thermoplastic articles within, means for heating the thermoplastic articles placed within the chamber to a temperature effective for thermal densification of the thermoplastic articles, a temperature sensing means located proximate to the heating means, means for controlling the heating means responsive to the temperature sensing means so as to provide a temperature within a range from about the temperature effective for thermally densifying thermoplastic articles to a temperature below the point of significant thermal degradation of the thermoplastic articles. In a preferred embodiment, the apparatus of the present invention is effective to render any food remains in or on the thermoplastic articles bacterially inert. A process for the thermal densification of thermoplastic articles is also provided.

Therefore, it is an object of the present invention to provide an apparatus to increase the bulk density of discarded thermoplastic articles, packaging and waste materials through a thermal process.

It is another object of the present invention to provide an apparatus capable of thermally densifying thermoplastic waste materials produced at a commercial or manufacturing location.

It is a further object of the present invention to provide an apparatus for the thermal densification of thermoplastic articles that would render food remains present on such articles bacterially inert.

It is still another object of the present invention to provide an apparatus for the thermal densification of thermoplastic waste having utility aboard naval vessels.

Yet another object of the present invention is to provide an apparatus for the thermal densification of thermoplastic waste or articles having a greatly reduced requirement for insulation in the walls thereof.

Another object of the present invention is to provide an apparatus for the thermal densification of thermoplastic waste or articles which utilizes circulating air to insulate the outside surfaces of the apparatus from its hot interior.

It is a still further object of the present invention to provide an effective process for the thermal densification of thermoplastic articles.

It is yet another object of the present invention to provide a process for the thermal densification of thermoplastic articles that would render food remains present on such articles bacterially inert.

It is a still further object of the present invention to provide a process for the thermal densification of thermoplastic waste at sea.

Other objects and the several advantages of the present invention will become apparent to those skilled in the art upon a reading of the specification and the claims appended thereto.

BRIEF DESCRIPTION OF THE DRAWINGS

FIG. 13 is a rear elevation of the third embodiment with the rear cover panels of the controls/blower cabinet and certain components removed.

FIG. 13A is a sectional view taken along 13—13 in FIG. 13.

DETAILED DESCRIPTION OF THE INVENTION

The present invention relates to an apparatus and process for the thermal densification of thermoplastic articles, particularly those articles of the expendable type. The apparatus is adapted for primary use at a commercial establishment, such as a fast-food restaurant or a grocery store, and is sized to easily handle the thermal densification of thermoplastic waste produced during a day's business activities. The present invention is best understood by reference to the appended figures, which are given by way of example and not of limitation.

Figure 1:
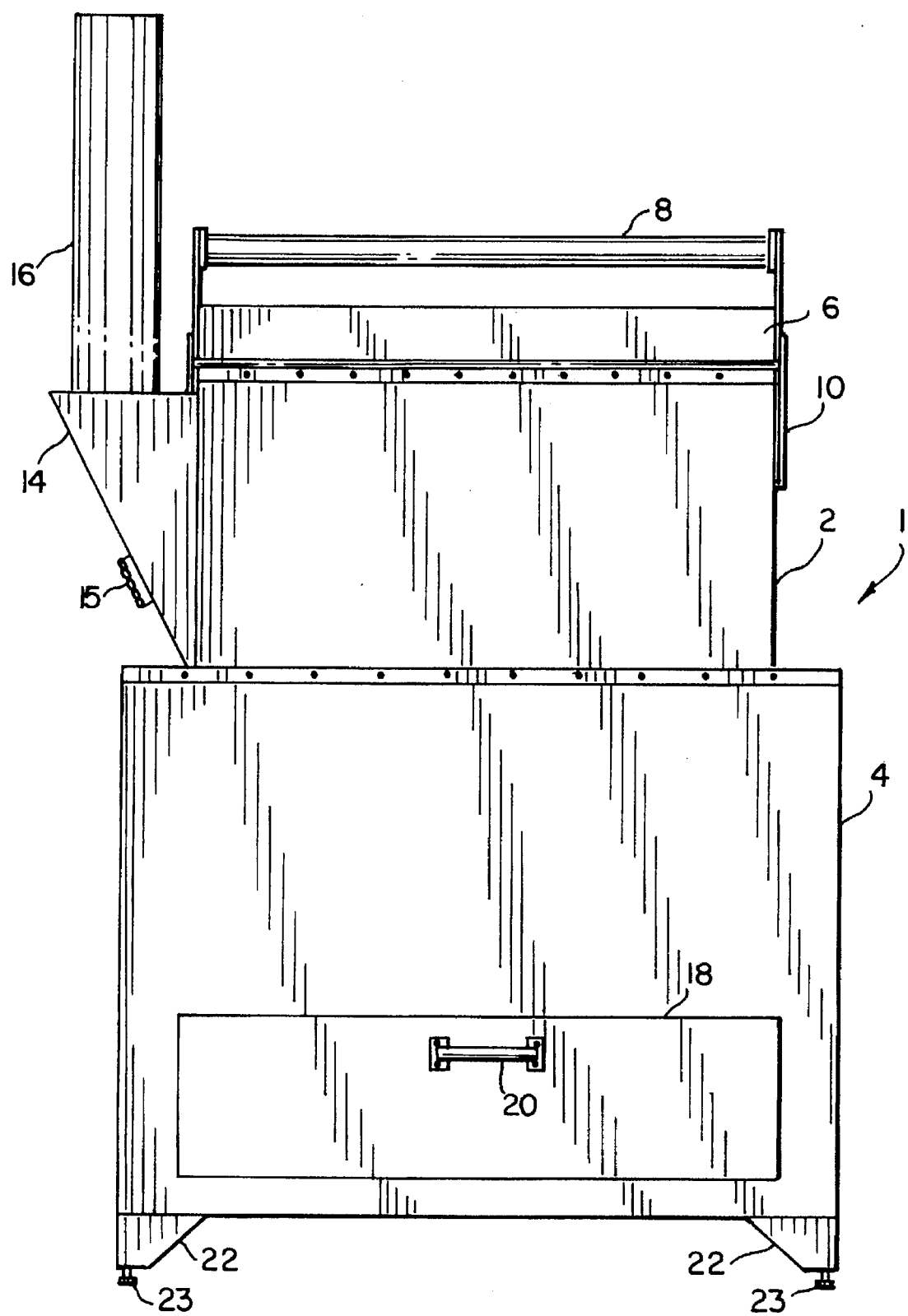
FIG. 1 is a frontal view of one embodiment of a thermal densification apparatus according to the present invention.

Referring now to FIG. 1, a frontal view of one embodiment of a thermal densification apparatus 1, according to the present invention, is shown. The apparatus shown is of a size appropriate for use in a commercial establishment, having the ability to house at least one large trash bag (approximately 20 to 40 gallons) of non-densified thermoplastic waste materials inside. The apparatus of FIG. 1 has an upper section 2 which has an opening at its top, covered by cover 6. Thermoplastic articles are placed inside apparatus 1 by first opening cover 6 by lifting handle 8, causing cover 6 to pivot away from the front of the unit on a pair of hinge members 10. (Hinge members 10 may be viewed in more detail by reference to FIG. 2.) Upon completion of the process of the present invention, the fully densified thermoplastic material may be removed by opening door 18 of lower section 4, using handle 20, and sliding out removable pan 34. (Removable pan 34 is shown in FIG. 3.) Heated process air is exhausted through exhaust stack 16 affixed to exhaust port housing 14. Fresh air for use in exhaust stream air dilution (optional) enters at fresh air entry 15. Legs 22 and adjustable feet 23 are provided to elevate the bottom of the apparatus from contact with the ground or floor upon which it is located and to level the apparatus. Also, casters can be mounted to legs 22 to facilitate movement of the apparatus. The legs also permit air to circulate underneath the apparatus.

Figure 2:
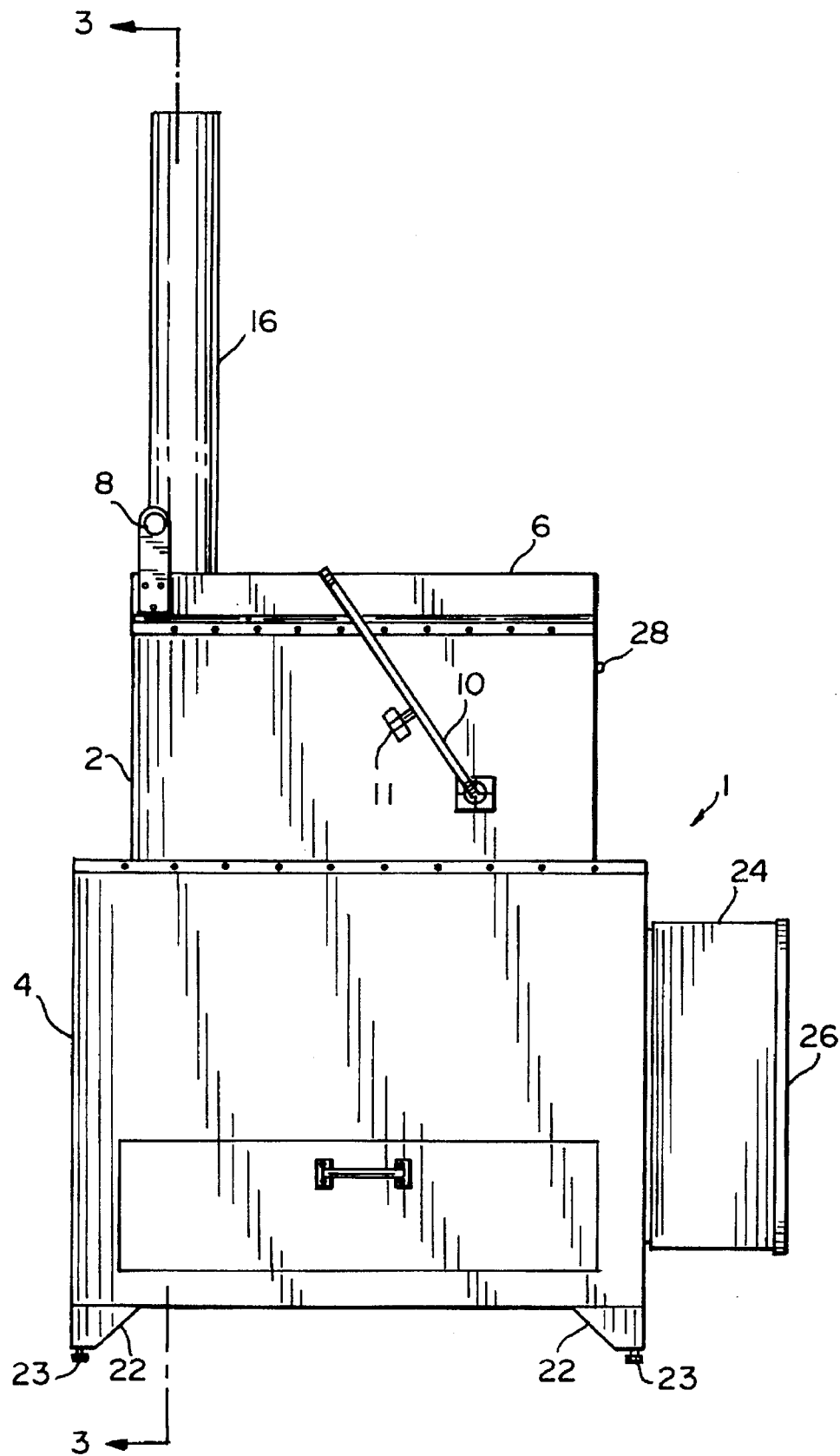
FIG. 2 is a side view of the FIG. 1 embodiment of a thermal densification apparatus.
Figure 3:
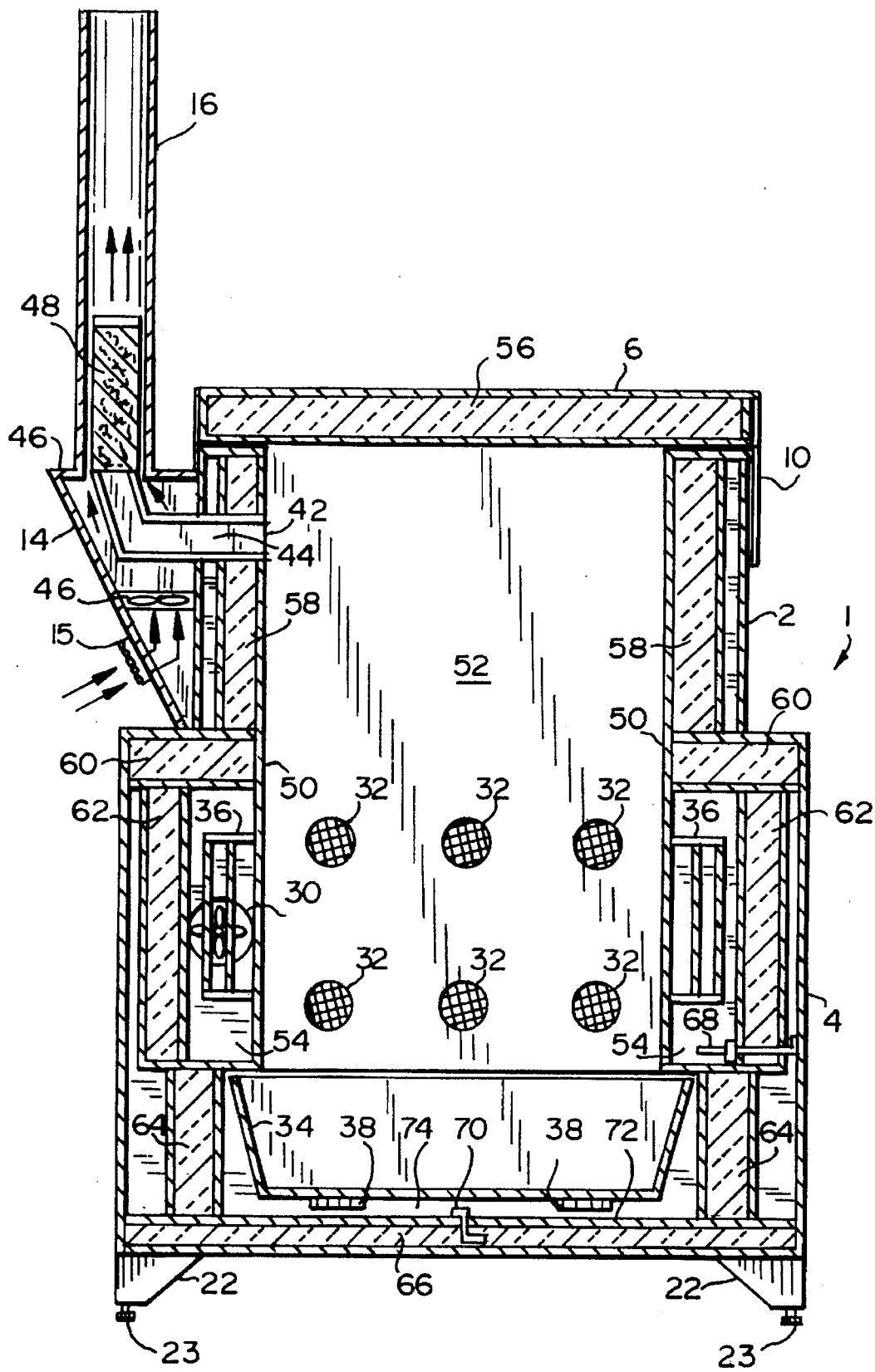
FIG. 3 is a view along section A—A of the FIG. 1 embodiment of a thermal densification apparatus.

Referring now to FIG. 2, a side view of the FIG. 1 embodiment of a thermal densification system is presented. As shown, hinge stop 28 is provided to prevent cover 6 from pivoting completely behind the thermal densification unit. Enclosure 24 is shown mounted to the rear of the thermal densification unit. Enclosure 24 houses the electrical controls for the unit, which include switching systems, temperature controllers, a fusing system, electrical wiring, and an electrical junction board (not shown). Access to these components is provided by hinged cover 26. For an extra measure of safety, contact switch 11 is provided to disable the heating system when cover 6 is opened for loading. Section line A—A is shown for reference thereto from FIG. 3.

A sectioned view of thermal densification apparatus 1 is presented in FIG. 3. As indicated, the section is taken along the line A—A, referred to in FIG. 2. The apparatus, including interior walls 50 which in part define heated air circulation chamber 54 and densification chamber 52, cover 6, outer cabinet sections 2 and 4, exhaust stack 16 and exhaust housing 14, is constructed of sheet metal. A wide variety of material is suitable for this application. For example, galvanized steel, aluminum, cold rolled steel, and stainless steel are excellent materials for constructing the apparatus of the present invention with cold rolled steel and stainless steel particularly preferred materials. Removable pan 34 may also be constructed of the same sheet metal material used to fabricate the apparatus. Pan 34 may be provided with tapered side walls, as shown, to facilitate removal of solidified material. To further facilitate removal of material, the interior surfaces of pan 34 may be coated with a non-stick surface coating such as industrial Teflon or stoneware.

Additional details concerning the apparatus and its operation will now be described by reference to FIG. 3. Thermoplastic articles are placed within the apparatus through cover 6, and enter densification chamber 52 to begin processing. Such articles may be loaded either by dumping individual articles into the apparatus, loosely, or by placing a thermoplastic trash bag which contains such articles inside. As can be appreciated, when seeking to segregate materials for recycling by thermoplastic material type, it may not always be desirable to discard the bag together with the articles, as the thermoplastic bag material may differ from the thermoplastic articles which it contains, resulting in significant contamination of the densified material and reducing its recovery value. When the thermoplastic articles are sufficiently reduced in size, the denser mass material will drop into pan 34. Thermoplastic articles in chamber 52 are initially heated by a forced-air heating system which is comprised of air inlet blower 30, one to two electrical resistance heaters 36, heated air circulation chamber 54 and a plurality of hot air inlets 32 leading into chamber 52. As can be envisioned, by virtue of the placement of air inlet blower 30, the heated air will circulate around heated air circulation chamber 54, which is defined in part by the outer walls of densification chamber 52, in a counterclockwise manner and pass through hot air inlets 32, at flow rates related to the resistance to flow imparted at each inlet by the thermoplastic articles undergoing the densification process and other factors. Greater densification is achieved by the combination of heating provided by resistance heaters 36 which heat circulating air in chamber 52 and by resistance heaters 38 located at the bottom of removable pan 34.

Heated air is exhausted through exhaust outlet 42 which leads to exhaust port 44 and exhaust stack 16. The air to be exhausted reaches exhaust outlet 42 through upward migration from the densification chamber 52 and pan 34. Exhaust and odor dilution may be provided by the use of fresh air pulled in and mixed with the exhaust from exhaust port 44 through the use of optional exhaust dilution fan 46. Optional filter 48 can also be employed in the exhaust stream to remove any smoke particles in the air exhausted from the apparatus.

With regard to heating requirements, while electrical resistance heating is particularly preferred, any type of heater capable of heating the contents of the apparatus to a temperature effective for the thermal densification of thermoplastic articles is acceptable. A type of electrical heating element which has been demonstrated to have utility in this application in chamber 54 is a serpentine-wound resistance heater. These elements can operate on 120 volts or 240 volts AC, depending upon the wattage used. As can be envisioned, a plurality of these heating elements can be used to more evenly heat the apparatus. As shown in FIG. 3, a total of four heating elements are provided, with elements 36 located in heated air circulation chamber 54 to provide forced air heating and elements 38 located below removable pan 34 to provide additional heating mainly from the bottom of the pan. A particularly preferred heating arrangement provides a total heating capacity of from 4,000 to 12,000 watts, an amount effective to thermally densify thermoplastic articles even when the apparatus is used outdoors during severe winter conditions.

Temperature sensors 68 and 70 are provided for monitoring system temperatures. While thermocouples are preferred for use as temperature sensors 68 and 70, thermistors, pyrometers and the like are also acceptable. Although an inner air circulation chamber temperature monitoring arrangement is shown for temperature sensor 68, it is known that other arrangements, such as an inner or outer chamber surface monitoring arrangement, would produce entirely acceptable results. Surface monitoring is particularly pertinent to the location of temperature sensor 70 which can be attached to bottom wall 72 of lower heating chamber 74, as shown, or mounted so as to contact the bottom of pan 34. The output of temperature sensors 68 and 70 are fed into temperature controllers (not shown, but located within enclosure 24) creating temperature feedback loops capable of assuring that the heating provided is of a level capable for effective thermoplastic thermal densification, but not so high as to chemically decompose or ignite the thermoplastic contents of the apparatus. The temperature controller can be of the adjustable variety, such as those marketed by Eurothem, Inc. or Tempco, Inc., permitting the safe and effective thermal densification of a wide variety of thermoplastic materials.

The temperature setting for the process of the present invention will generally be one which is at least effective for the thermal densification of the thermoplastic articles placed within the apparatus. While this will generally be a temperature of at least about 250° F., it is preferred that the temperature not exceed a value which would alter the molecular weight of the thermoplastic articles by an amount exceeding 50% of their original molecular weight. In no case should the temperature selected be one which produces thermal ignition of the thermoplastic or other material in the apparatus.

To minimize process energy requirements and keep the apparatus from becoming excessively hot to the touch, insulation should be advantageously utilized. As shown in FIG. 3, a preferred arrangement employs insulative panels adjacent to virtually all heated areas of the apparatus. As may be seen, insulative panel 56 is located within the walls of cover 6, insulative panels 58 surround the upper portion of chamber 52, insulative panels 62 surround heated air circulation chamber 54, insulative panels 60 surround the mid portion of chamber 52, as well as the top portion of heated air circulation chamber 54, insulative panels 64 surround the sides of removable pan 34, and insulative panel 66 is located within the walls of the bottom of the apparatus. Since the temperature required to thermally densify most thermoplastic materials will normally be in excess of about 250° F. (usually about 300° F. to about 350° F.), the insulative material selected should be one able to withstand such temperatures. Fiberglass-based insulation is one such material known to have utility in this application.

To prevent the build-up of excessive moisture and fumes within the apparatus during use, a flow-through ventilation system is provided. This system consists in its essential elements of outlet 42, exhaust port 44, located within exhaust port housing 14, and exhaust stack 16 in communication with exhaust port 44. Air is pulled into the apparatus at inlet blower 30 and is adjusted to circulate air at a flow rate of about 15 to 35 SCFM through the unit, with a flow rate of about 25 SCFM preferred. Optionally, exhaust dilution fan 46 may be provided to provide a flow of fresh air into the exhaust system for diluting the exhaust heat which passes into the exhaust port from exhaust outlet 42. Exhaust dilution fan 46 should be capable of flowing at least about 100 SCFM for optimal effectiveness. Another option is the use of a filter element 48, which can be of the activated charcoal-type, to remove any smoke particles from the exhaust. It is also within the scope of the present invention to provide an inert gas ventilation system (not shown), rather than a fan-assisted ventilation system. Pressurized nitrogen can be effectively used in this regard. The use of inert gas can provide an additional measure of safety in the operation of the process of this invention.

Figure 4:
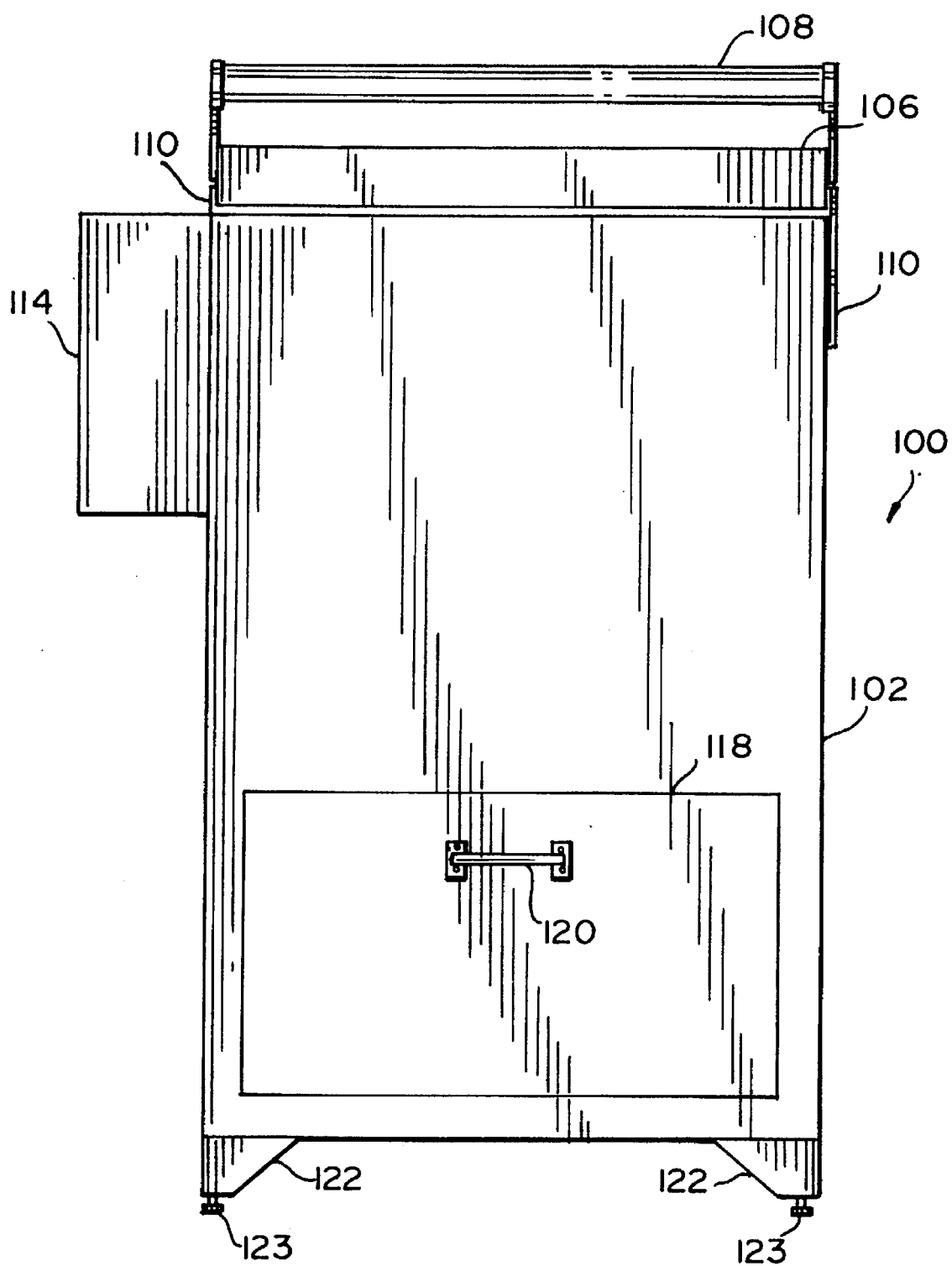
FIG. 4 is a frontal view of second embodiment of a thermal densification apparatus according to the present invention.

A second embodiment of the present invention is depicted in FIG. 4. Referring now to FIG. 4, a frontal view of thermal densification apparatus 100 is shown. As was the case with the previously described embodiment, the apparatus of FIG. 4 is of a size appropriate for use in a commercial establishment, having the ability to house one large trash bag (approximately 20 to 40 gallons) of non-densified thermoplastic waste materials inside. The apparatus of FIG. 4 has cabinet 102, which houses inside chambers 150 and 152 (see FIG. 6), into which thermoplastic articles are placed for thermal densification by first lifting handle 108 of cover 106, causing cover 106 to pivot away from the front of the unit on a pair of hinge members 110 (see FIG. 5.) Once inside, the thermoplastic articles pass into and through chambers 150 and 152 and into pan 134 through opening 180 (see FIG. 6). Referring now to FIGS. 4 and 6, the densified thermoplastic material in pan 134 may be removed by opening door 118, using handle 120, and sliding out removable pan 134. When the thermoplastic material is cooled, it may be removed from pan 134 by turning the pan upside down. Pan 134 is provided with tapered side walls to facilitate removing the material. To further facilitate removal of material, the interior surfaces of pan 134 may be coated with a non-stick surface coating such as industrial Teflon or stoneware. Hot air is exhausted through exhaust port 144, located within exhaust port housing 114, shown in FIG. 6.

Legs 122 are provided to elevate the bottom of the apparatus from contact with the ground or floor upon which it is located, permitting air to circulate underneath the apparatus. Legs are also provided with adjustable feet 123 which enable the apparatus to be leveled upon an uneven surface. Also, casters can be mounted to legs 122 to facilitate movement of the apparatus.

Figure 5:
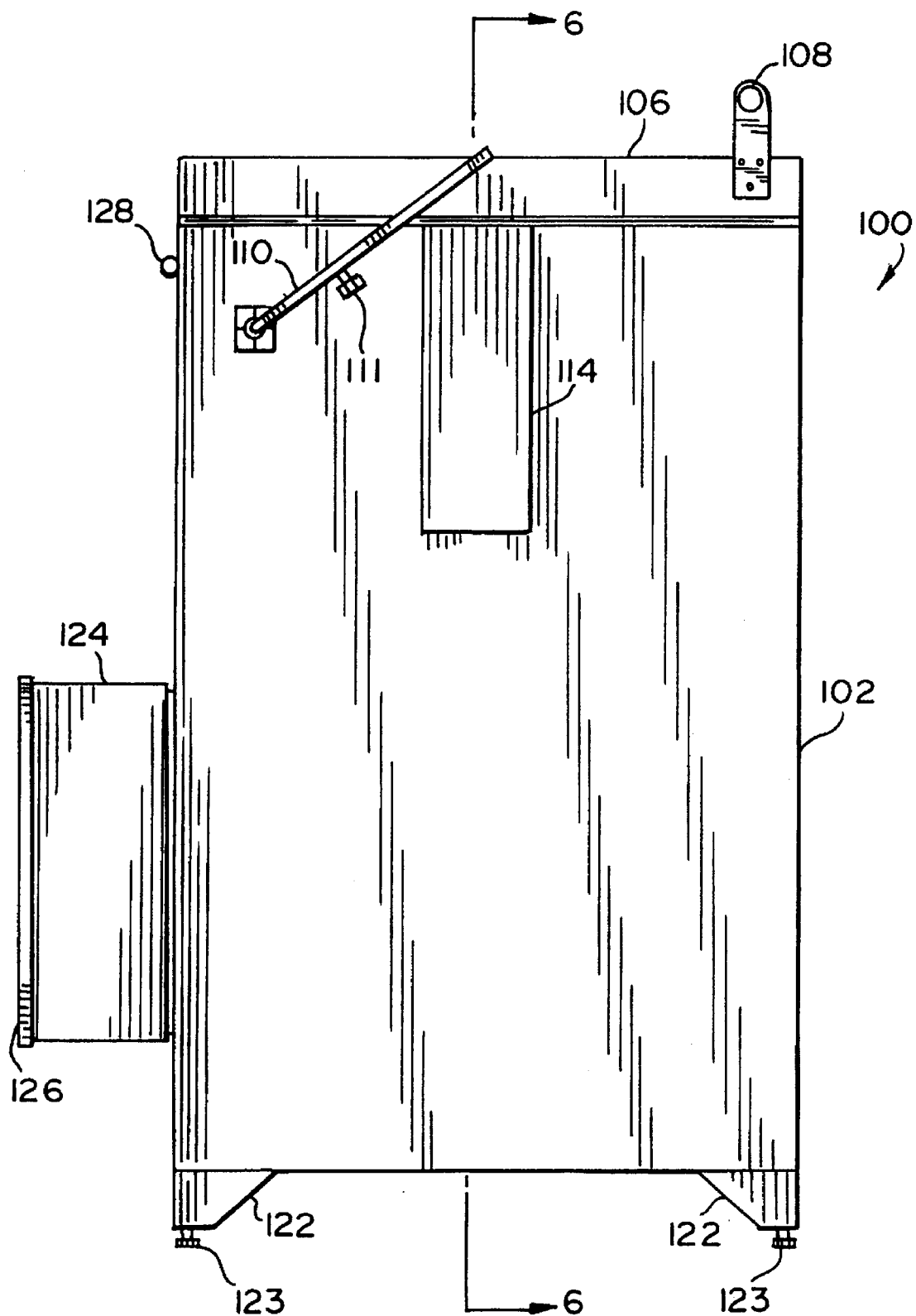
FIG. 5 is a side view of the FIG. 4 embodiment of a thermal densification apparatus.
Figure 6:
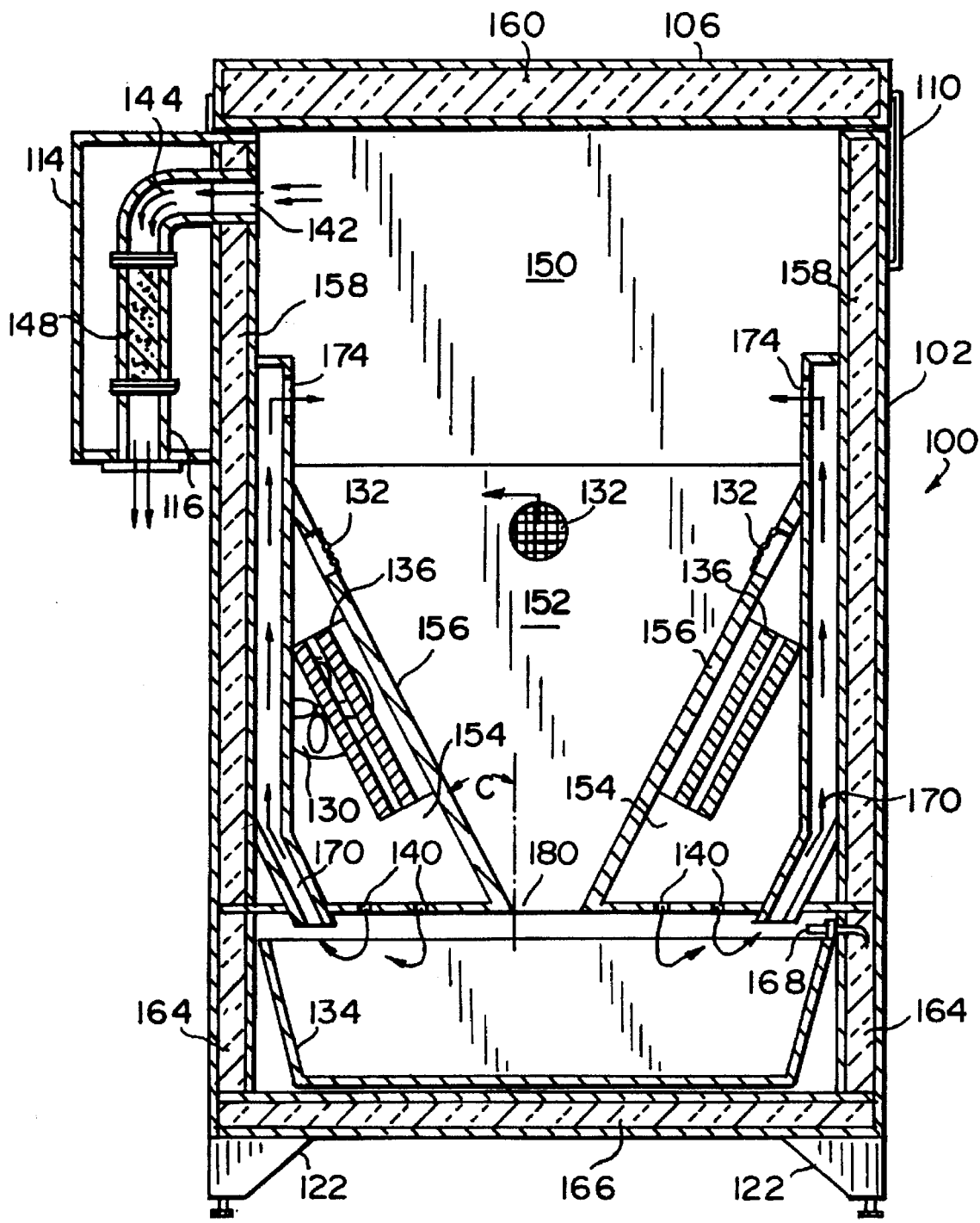
FIG. 6 is a view along section B—B of the FIG. 4 embodiment of a thermal densification apparatus.

Referring now to FIG. 5, a side view of the FIG. 4 embodiment is presented. As shown, hinge stop 128 is provided to prevent cover 106 from pivoting completely behind the thermal densification unit. Enclosure 124 is shown mounted to the rear of the thermal densification unit. Enclosure 124 houses the electrical controls for the unit, which, as with the previously described embodiment of FIG. 1, include a switching system, temperature controller, fusing system, electrical wiring and an electrical connection junction board (not shown). Access to these components is provided by hinged cover 126. Contact switch 111 is provided to disable the heating system when cover 106 is opened for loading. Section line B—B is shown for reference thereto from FIG. 6.

A sectioned view of the thermal densification apparatus of the FIG. 4 embodiment is presented in FIG. 6. As indicated, the section is taken along the line B—B, referred to in FIG. 5. The apparatus, including outer-cabinet 102, cover 106, pre-shrink chamber 150, conical densification chamber 152 and heat chamber 154 is constructed of sheet metal. Again, a wide variety of material is suitable for this application, with cold rolled steel and stainless steel particularly preferred. Removable pan 134 may also be constructed of the same sheet metal material used to fabricate the apparatus and coated with a non-stick material on the interior surfaces.

Additional details concerning the apparatus and its operation will now be described by reference to FIG. 6. Thermoplastic articles are placed within apparatus 100 through cover 106, and into pre-shrink chamber 150 to begin processing. As before, the articles may be loaded either by dumping individual articles into the apparatus, loosely, or by placing a thermoplastic trash bag which contains such articles inside. Pre-shrinking is effected through heated air which radiates upward from heated densification chamber walls 156, as well as by the flow of air, heated as described below, which emanates from ports 132 and 174. When the heat collapses the thermoplastic articles to a sufficient degree, the thermoplastic articles in pre-shrink chamber 150 will pass to densification chamber 152. When the articles pass to densification chamber 152, they continue to be heated by hot air and by heated sidewalls 156.

The heating system located in heat chamber 154 is comprised of air inlet blower 130, two electrical resistance heaters 136, heated air circulation chamber 154, heated chamber walls 156 and a plurality of hot air outlets 132 and 140. Again, by virtue of the placement of inlet blower 130, the heated air circulates around heated air chamber 154, which is defined in part by the outer walls of densification chamber 152, in a counterclockwise manner and passes through hot air inlets 132 and 140 at flow rates related to the resistance to flow imparted at each outlet by the thermoplastic articles undergoing the densification process and other factors. The material, in a more dense state, flows down the chamber walls 156 through opening 180 and into pan 134. To facilitate material flow, chamber walls 156 may be coated with a non-stick material such as industrial Teflon.

Orifice 180 may be sized based upon the overall dimensions of the typical articles to be densified. In other words, the articles generally should not drop through to the pan without first being subjected to the densification process. Accordingly, when fast-food type thermoplastic articles are to be the primary articles to be densified, it is preferred that orifice 180 be sized within a range of from about 2 inches to about 8 inches in diameter, with about 4 inches to about 6 inches in diameter particularly preferred. Should orifice 180 be formed to be substantially non-circular in cross section, its cross-sectional area should be sized to fall within the range of the cross-sectional areas of the preferred circular orifices.

Greater densification is achieved as the thermoplastic articles lose air cells and shape and the material passes through the narrowing conical densification chamber 152 and exits through orifice 180 as a viscous material into removable pan 134. Here the material is further heated by hot air from ports 140 and flows forming a block of densified material.

Referring still to FIG. 6, to achieve good performance from the apparatus of the present invention, it is preferred that the sidewalls 156 be fabricated to have an angle C, measured from a vertical plane through the apparatus, as shown, which falls within a range of angles from one which enables the bulk density of the articles to be increased by at least about 100 percent of original bulk density for the level of heat provided, up to one which permits the densified material to still flow downward without significant material accumulating on sidewalls 156. It is preferred that angle C fall within a range of from about 15° to 45°, with an angle C of 20° to 25° being particularly preferred.

Heated air is exhausted through exhaust outlet 142 which leads to exhaust port 144 and exhaust pipe 116. Exhaust air may reach exhaust outlet 142 through several ways, including upward radiation. Another route is by the upward heated air flow through orifice 180 and/or through tubes 170 which are fed by heated air flowing from heated chamber 154 through outlets 140.

Exhaust heat and odor dilution may be provided by the use of fresh air pulled in and mixed with exhaust from exhaust port 144 through the use of an optional exhaust dilution fan, not shown, but similar to that depicted for the embodiment of FIGS. 1 through 3. Optional filter 148 can also be employed in the exhaust stream to remove any smoke particles from the air exhausted from the apparatus.

Again, with regard to heating requirements, any type of heater capable of heating the contents of the apparatus to a temperature effective for the thermal densification of thermoplastic articles is acceptable. The electrical heating element described above as being preferred in the FIG. 1 embodiment has also been demonstrated to have utility in this embodiment. Again, this is a serpentine-wound resistance heater. These elements can operate on 120 or 140 volts depending on the wattage used. As shown, two such heating elements are used to evenly heat the apparatus, these being depicted in FIG. 6 as heating elements 136. Heating elements 136 are located in heating chamber 154. This particularly preferred heating arrangement provides a total heating capacity of about 4,000 to 10,000 watts, an amount effective to thermally densify thermoplastic articles even when the apparatus is used outdoors during severe winter conditions.

Temperature sensor 168 is provided for monitoring the temperature of the heating system. Although a particular monitoring arrangement is depicted, it is known that other arrangements would produce entirely acceptable results. The output of temperature sensor 168 is fed into a temperature controller (not shown, but located within enclosure 124) creating a temperature feedback loop capable of assuring that the heating provided is of a level capable for effective thermal densification of thermoplastic materials, but not so high as to chemically decompose or ignite the thermoplastic, or other materials, placed within the apparatus. The temperature controller can be of the same adjustable variety as those previously described, permitting the safe and effective thermal densification of a wide variety of thermoplastic materials.

The temperature setting used for the second embodiment of the present invention will again be one which is at least effective for the thermal densification of the thermoplastic articles placed within the apparatus. As before, while this will generally be a temperature of at least about 250° F., it is preferred that the temperature not exceed a value which would alter the molecular weight of the thermoplastic articles by an amount exceeding 50% of their original molecular weight. In no case should the temperature selected be one which produces thermal ignition of the thermoplastic material.

To minimize process energy requirements and keep the apparatus from becoming excessively hot to the touch, insulation is recommended. As shown in FIG. 6, a preferred arrangement employs insulative panels adjacent to a majority of the areas heated. As shown, insulative panel 160 is located within the walls of cover 106, insulative panels 158 surround pre-shrink chamber 150 and heated chamber 152, insulative panels 164 surround the sides of removable pan 134, and insulative panel 166 is located within the walls of the bottom of the apparatus. Since the temperature required to thermally densify most thermoplastic materials will normally be in excess of about 250° F. (usually about 300° F. to 350° F.), the insulative material selected should be one able to withstand such temperatures, with fiberglass-based insulation being one preferred material.

To prevent the build-up of excessive heat and fumes within the apparatus during use, a flow-through ventilation system is also provided in this embodiment of the present invention. This system consists in its essential elements of inlet fan 130, the forced air heating system, previously described, exhaust outlet 142, exhaust port 144, located within exhaust port housing 114, and exhaust pipe 116. Optionally, an exhaust dilution fan, not shown, may be provided to mix fresh air into the exhaust system and dilute the exhaust air which passes into the exhaust port 144. Also, optional filter element 148, which can be of the activated charcoal-type, can be provided. Moreover, an inert gas ventilation system (not shown) can be provided, rather than a fan-assisted ventilation system.

Figure 10:
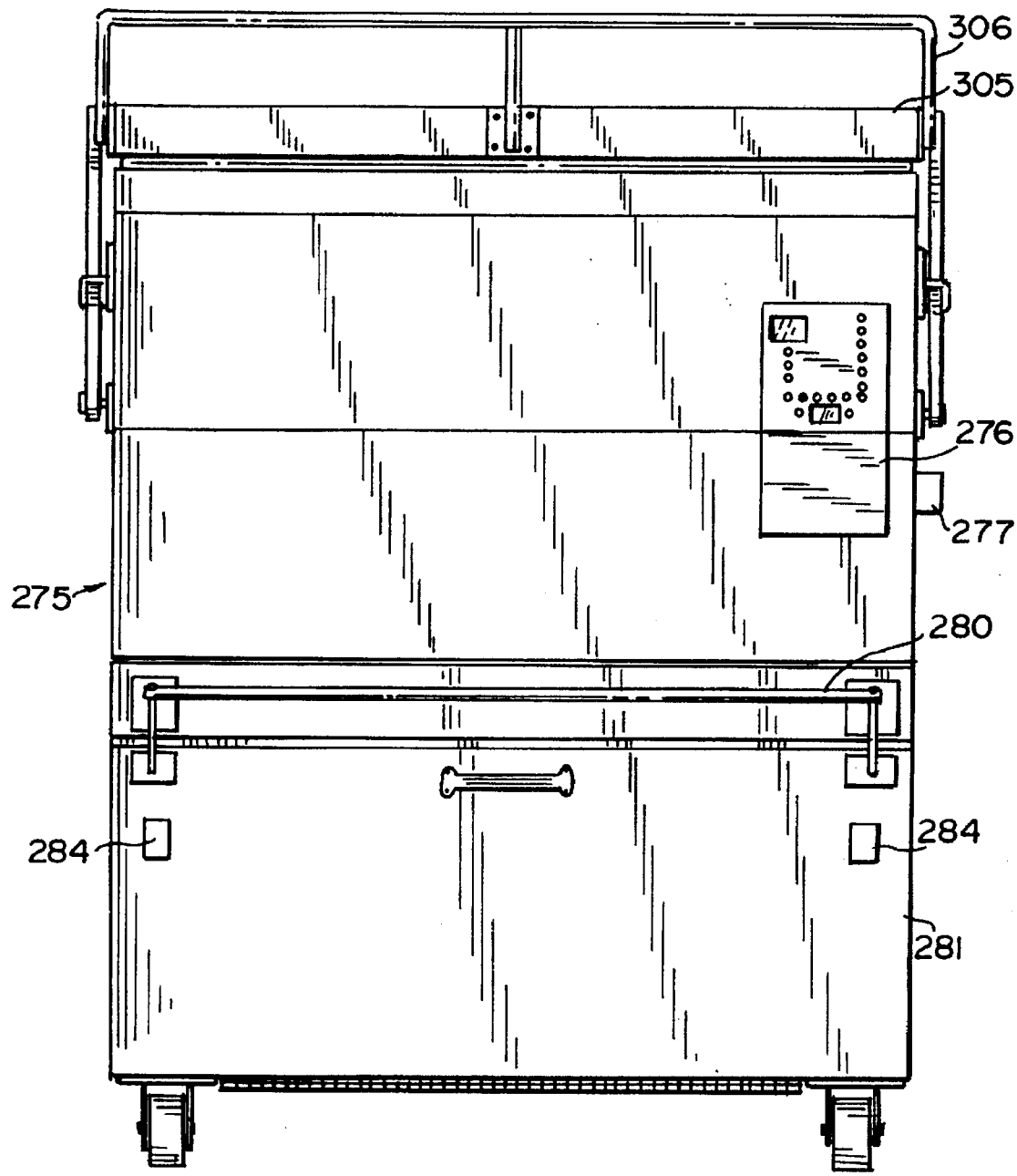
FIG. 10 is a front view of a third embodiment of the thermal densification apparatus of the present invention.
Figure 11:
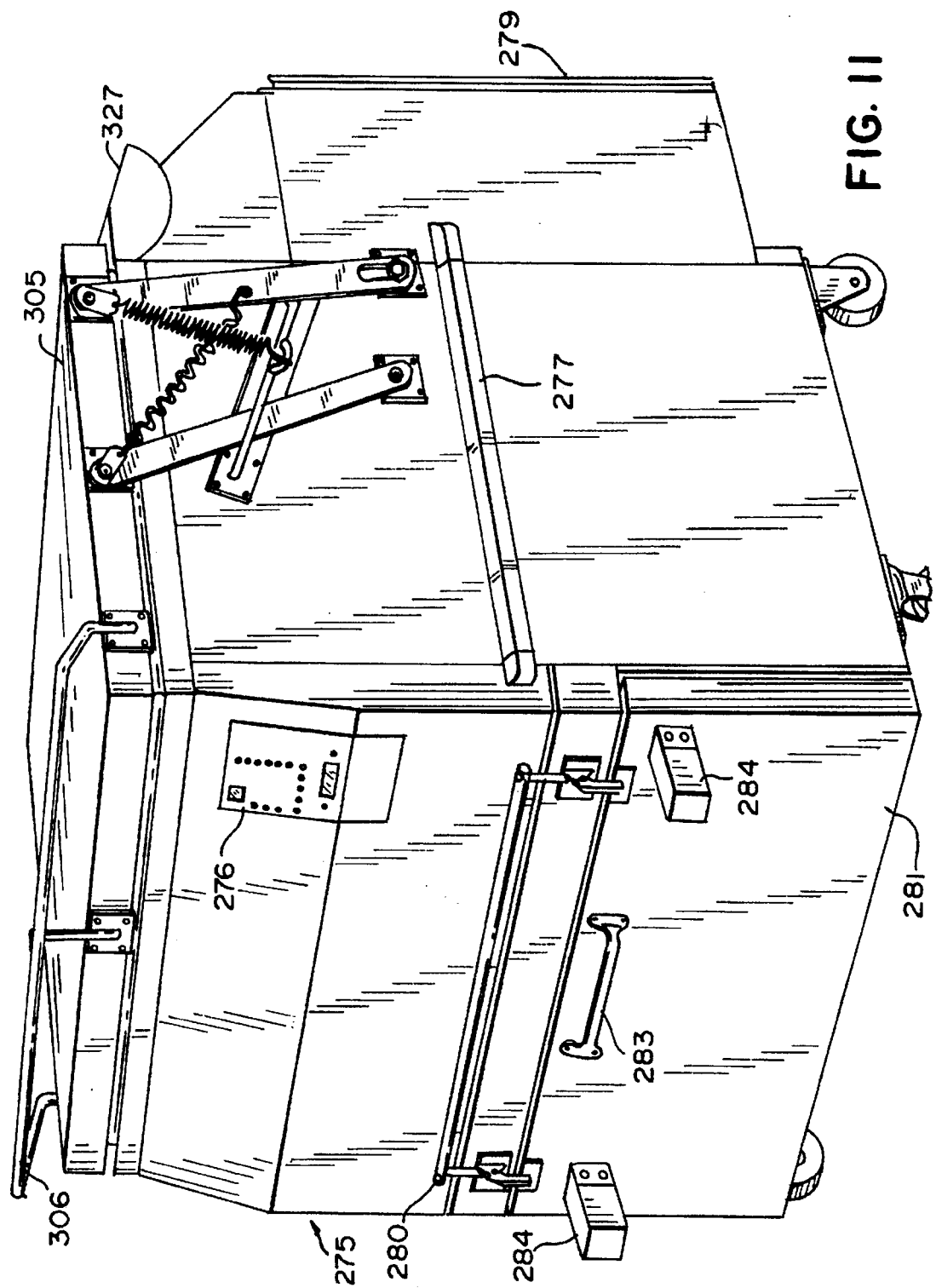
FIG. 11 is a perspective view of the third embodiment.

Turning to FIGS. 10 and 11, a front elevation and frontal perspective view of a third embodiment of the thermal densification apparatus of the present invention is illustrated. This apparatus is also sized for use in a commercial establishment with the ability to accept one large trash bag of non-densified thermoplastic articles. This embodiment incorporates significant improvements to the operating principles of the previously described embodiments.

This embodiment is comprised of a thermally insulated, closed cabinet, a hopper disposed or mounted within the cabinet and a convection heating system. Referring to FIG. 15, it can be seen that the hopper has an upper section 361 and a lower pan chamber 371 in communication with the upper section 361. The upper section 361 is generally funnel-shaped and is formed by flat sloping walls 366 which intersect vertical walls 367. The convection heating system includes an air heat exchanging chamber having an upper section 350 and a lower section 354, an upper heater chamber 359, means for heating circulating air flow therethrough 368, and a forced-air inlet blower 285 (FIG. 13). Except for the insulating air space, each of the chambers is adapted to create a generally circular air flow therethrough about the hopper. The system further includes air distribution plenum 370 shown in FIGS. 14, 15 and 16 which is positioned at the top of the lower pan chamber 371 and is in open communication therewith as described in more detail herein below.

Turning now to FIGS. 11, which shows a front perspective view and 13, which shows a rear elevation of the apparatus showing the rear door and cover removed, it can be seen that a control panel 276 is positioned on the front of the apparatus and contains indicating lights which communicate to the operator the current operational status of the apparatus. The control panel 276 is connected to the electronic control circuitry 282 located at the rear of the apparatus via wiring in the external raceway 277. A removable door 279 provides access to the electronic control circuitry 282 and the forced-air inlet blower 285 (See FIG. 13). An exhaust chamber shown generally at 405 is located adjacent to the cabinet 278 and is accessed by removing a separate cover. The electronic control circuitry 282 for the apparatus is located in the left section of the cabinet. The forced-air inlet blower 285 is adjacent the control circuitry separated by a partition.

Figure 14:
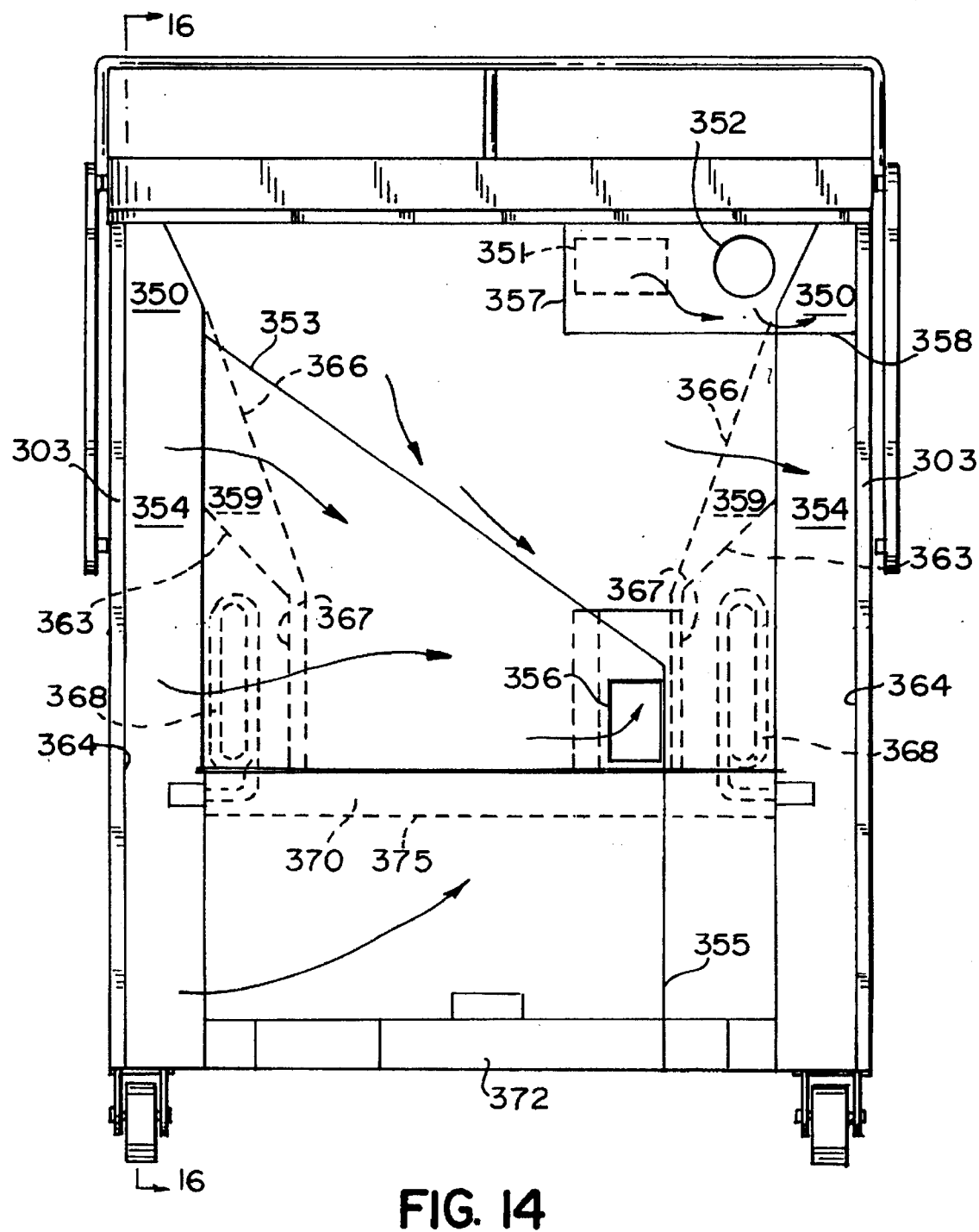
FIG. 14 is a sectional view of the third embodiment taken along 14—14 in FIG. 12.
Figure 15:
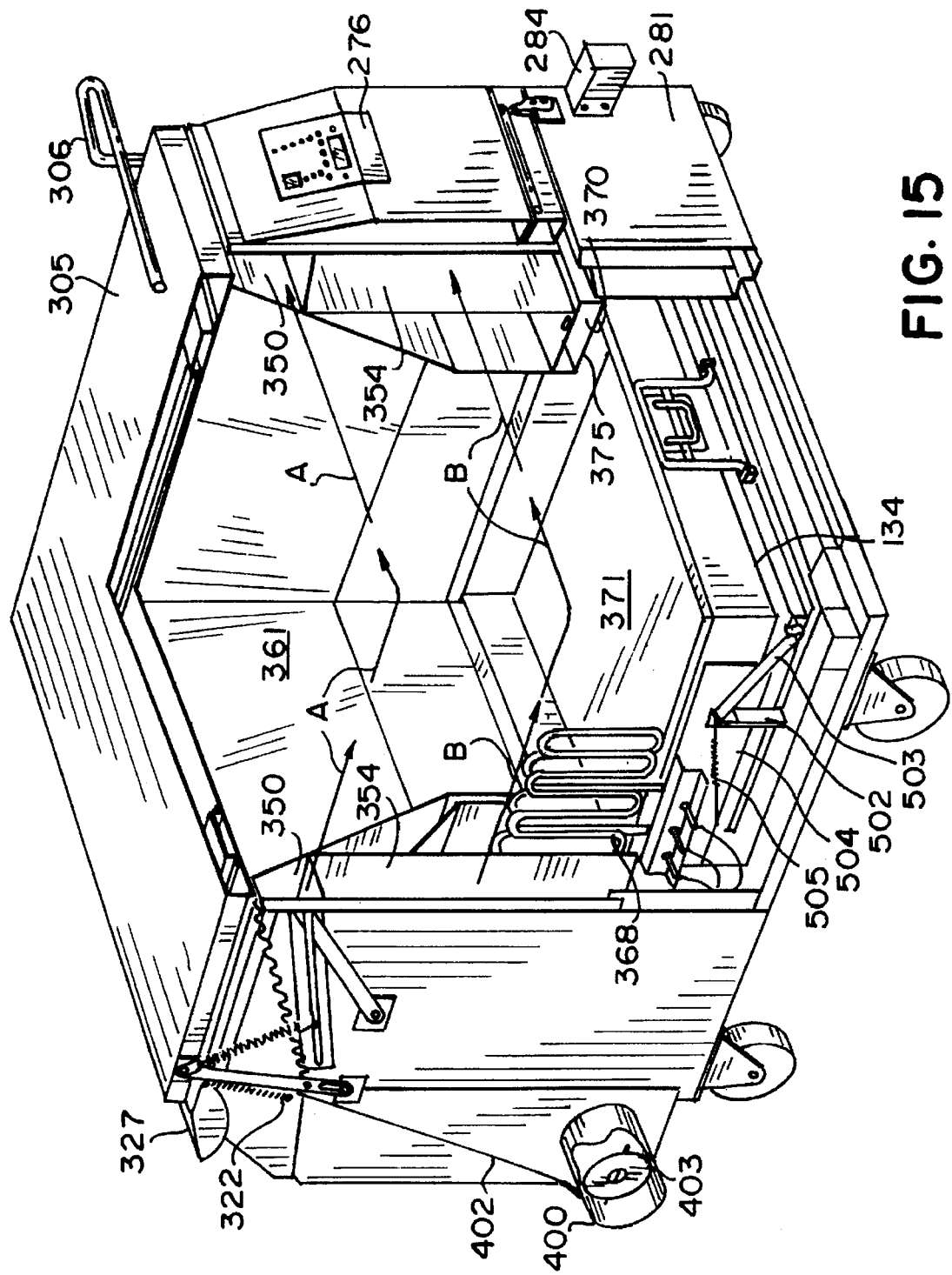
FIG. 15 is a partial cut away perspective view of the third embodiment showing air flow therethrough.
Figure 17:
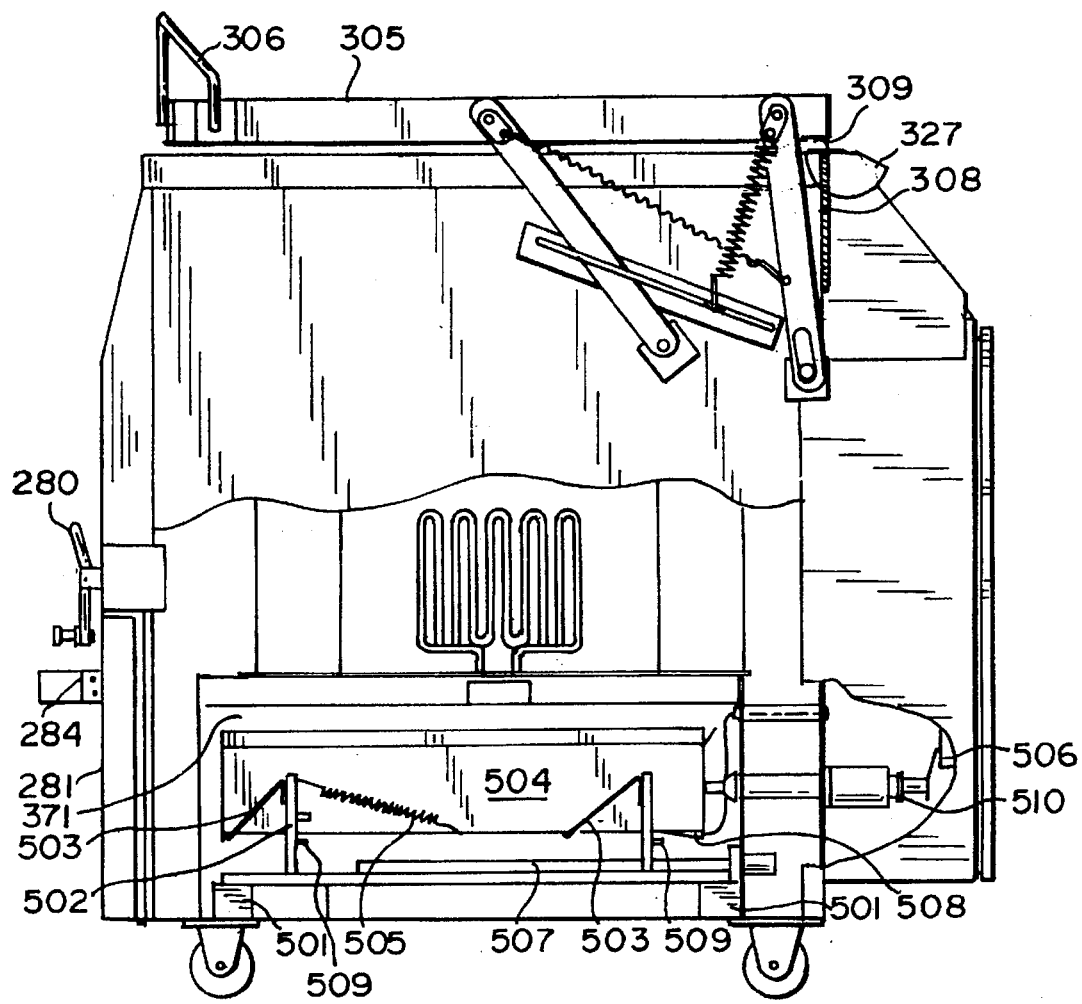
FIG. 17 is a partial cut away view of the third embodiment from the side showing the pan carrier assembly.

Turning now to FIGS. 14, 15 and 17, there is shown the lower pan chamber 371 of the hopper which houses a pan carriage assembly shown generally at 500. The lower pan chamber 371 is supported on the floor of the apparatus by feet 501. The pan carriage assembly 500 holds the removable pan 134 (FIG. 15) in which the densified thermoplastic material or waste is collected. The assembly is comprised of a pan carrier 504 which is movably suspended above the floor of the apparatus between two upright supports 502, two leaf springs 503 and a coil spring 505 located on each side of the pan carrier. As the pan fills with densified material, the pan carrier swings down and towards the rear of the apparatus. Travel stops 509 located on each side of the pan carrier may be incorporated to ensure that the pan carrier does not touch the back wall of the pan chamber. During its rearward movement, the pan carrier engages a micro-switch 506 that causes the illumination of an indicating light on the control panel 276. The weight and indirectly the size of the block of densified material collected in the pan 134 may be controlled by adjustment means 510 (FIG. 13) which changes the amount of force required to engage the micro-switch 506.

During the densification process the thermoplastic articles or waste contained in the hopper upper section 361 and lower pan chamber 371 tend to initially densify into a mounded shape in the pan 134 due in part to the self-insulating property of some thermoplastic materials such as polystyrene. The mounded shape is caused by the material at the bottom of the pan 134 becoming insulated from the heat introduced near the surface of the mound. The mounding is also a byproduct of the relatively low temperatures used to densify the thermoplastic material. It would be possible to use higher temperatures in the convection heating system. However, problems with ignition of paper mixed in with the thermoplastic materials and thermal degradation of the thermoplastic materials could result. This problem is addressed by the pan heater 507 (FIG. 17) which is located underneath the pan carrier 504. The heater provides sufficient heat to cause the densified material to spread across the bottom of the pan 134. The operation of this heater is also controlled by the electronic control circuitry 282 which cycles the heater on and off as needed in response to the output of temperature sensor 508 secured to the bottom of the pan carrier 504. The same temperature sensor 508 or an additional sensor may also be used to detect overtemperature conditions. In a preferred embodiment, the temperature sensor 508 in conjunction with the electronic circuitry 282 controls the operation of the pan heater 507 to maintain a temperature of about 149° C. to 232° C. (300° C. to 450° F.) at the base of the pan carrier. In this embodiment the heater is a tubular resistance-type electric heater having a power rating of about 1200 to about 2000 watts. More preferably a heater power of about 1800 watts is used. A particularly preferred unit is the Model CH-810XX manufactured by the Chromalox Corporation. The practice of the present invention includes the use of other types and shapes of heater elements to address the mounding problem. The power rating of the heater may easily be adjusted by one of ordinary skill in the art depending on factors that include the size of pan used and whether the apparatus will be used indoors or outdoors.

Referring now to FIGS. 10 and 11, additional components of this embodiment include a lower door 281 having mounted thereon a push-pull handle and latch assembly 280 that permits easy, one-hand operation for opening and closing. A secondary handle 283 is also provided. Door supports 284 are constructed of a resilient material capable of cushioning the impact of the supports against the floor as the door is lowered into an open position. The supports also serve to hold the open door in a horizontal position to facilitate the removal of the pan 134 containing the densified thermoplastic material.

An exhaust chamber 405 is depicted in FIG. 13 at the rear of the apparatus. The exhaust chamber 405 holds the exhaust pipe 404 which is attached at an upper end to the exhaust port 352 (FIG. 14) in the hopper upper section. Air exits the exhaust pipe 404 through a metal-sock filter 407 which traps any particulate matter in the air stream. Exhaust duct 400 is attached to an opening in the lower end of the exhaust chamber. The exhaust duct 400 has an inside diameter of about 15.24 cm to 20.32 cm (6 to 8 in). An exhaust baffle 403 is pivotally mounted within the exhaust duct 400. Linkage assembly 402 is connected at an upper end to a guide hinge member 322 and is connected at a lower end to the exhaust baffle. For the duct diameter specified above, the baffle contains an opening 410 of about 5.08 cm to 10.16 cm (2 to 4 in). During normal operation with the lid 305 closed the baffle 403 is closed and positioned perpendicular to the air flow through the exhaust duct 400. As can be seen in FIG. 13A, the baffle thus restricts the cross sectional area of the exhaust duct 400 to that of the opening 410. (Baffle 403 has been shown smaller that actual size for clarity.) As the lid is opened, the action of the linkage assembly 402 rotates the baffle 90 degrees to be parallel to air flow and thus greatly increase the volume of air pulled through the exhaust duct 400.

Figure 12:
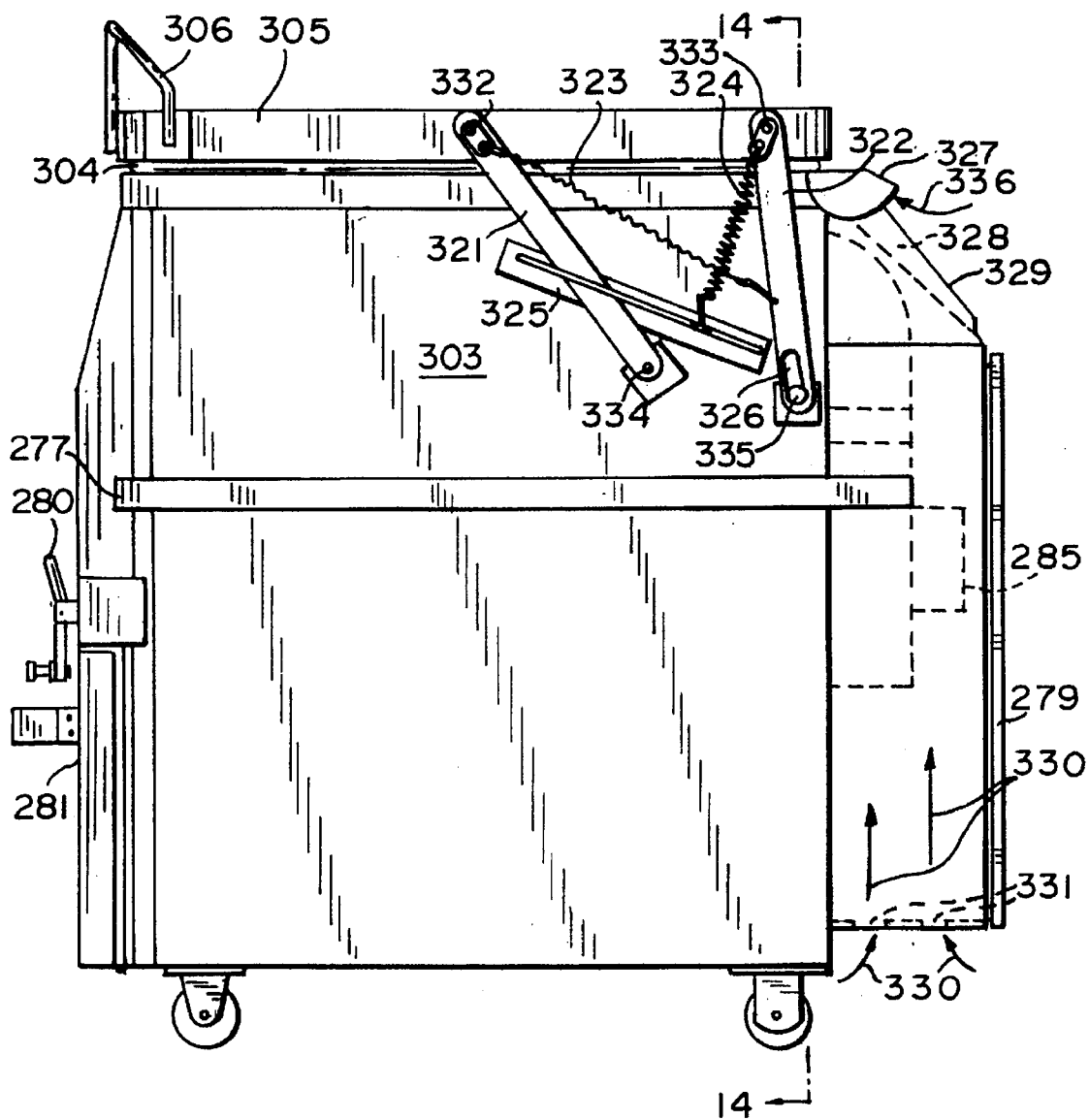
FIG. 12 is a side elevation of the third embodiment.

In the side view of FIG. 12, there is shown a novel hinge assembly indicated generally at 320. The hinge assembly 320 is comprised of main hinge member 321, guide hinge member 322, and first hinge spring 323, second hinge spring 324, and hinge guide 325. Hinge members 321, 322 are pivotally mounted at upper pivot points 332, 333 to the lid 305 and at a lower pivot points 334, 335 to the side panel 303 of the apparatus. A guide hinge slot 326 is provided in the guide hinge member 322 at that member's lower end. In similar fashion the upper ends of the hinge springs 323, 324 are pivotally connected to the lid at the same point that the hinge members 321, 322 are so mounted. The lower end of the first hinge spring 323 is pivotally mounted to the guide hinge member 322 about midway down its length. The lower end of the second hinge spring 324 is pivotally mounted to the hinge guide 325 which is rigidly attached to the side panel 303. The hinge guide 325 provides a stop to limit the backward travel of the main hinge member 321 and therefore the lid during opening. The hinge guide 325 also prevents side to side movement of the hinge members 321, 322 and thus the lid 305.

The guide hinge slot 326 is provided to permit the lid to be adjusted to be parallel to gasket 304 to ensure a tight seal therebetween. As the lid is initially installed, the connection between the lower end of the guide hinge member 322 and the side panel 303 is left loose. As the lid is securely aligned atop the gasket 304, the guide hinge member 322 will travel a short distance downwardly so that its lower pivot point 333 may move up from the bottom of the slot 326. After lid alignment is complete, the lower end of the guide hinge member 322 is pivotally secured to the side panel 303. As the gasket 304 wears during use, the guide hinge member connection may be loosened to permit vertical adjustment of lid 305 against the gasket 304 and then retightened for operation. A tight fit between lid 305 and gasket 304 is important to prevent vapors/odors from escaping the unit during use. A significant aspect of the adjustable feature of this hinge assembly is that the closed lid may be adjusted vertically without changing the location of the hinge member pivot points on the apparatus. Note that the location of pivot point 333 within the slot 326 will vary, but the location of the pivot point's attachment to the side panel will not vary. Adjustment of the hinge assembly is accomplished quickly and simply.

As can be seen in FIG. 12, when the lid 305 is closed, the first hinge spring 323 is under tension and the second hinge spring 324 is relaxed. The lid is supported by hinge members 321 and 322 as it is opened. Because the substantial weight of the lid may make controlling the opening motion difficult, the second hinge spring 324 dampens the momentum of the lid as it is opened. Simultaneously, the first hinge spring 323 which had been under tension is gradually relaxed. The hinge assembly operation is reversed as the lid is closed with the first hinge spring 323 serving to dampen the closing momentum. Each of the hinge springs serves to reduce the force required to overcome the inertia of the lid 305 at rest while the opposing spring dampens the momentum generated once the lid is in motion.

It should be noted the novel hinge assembly of the present invention causes the lid of the apparatus to move upwardly as it is first opened. This upward motion causes the lid to clear the gasket 304 without sliding contact therewith and is a result of the non-vertical alignment of the attachment points of the upper ends and the lower ends of the individual hinge members. Wear on the gasket 304 is substantially reduced by this arrangement. The hinge assembly moves the lid 305 rearwardly and downwardly in an arc above the air sweep chamber 328 and the controls/blower cabinet 278. The lid 305 comes to rest in a final position that requires minimal space behind the apparatus. The hinging motion ensures that the hot lower surface of the lid is positioned well away from the operator when the lid is fully opened. Moreover, the location of the center of gravity of the lid 305 in the fully open position prevents the lid from closing accidentally.

Figure 16:
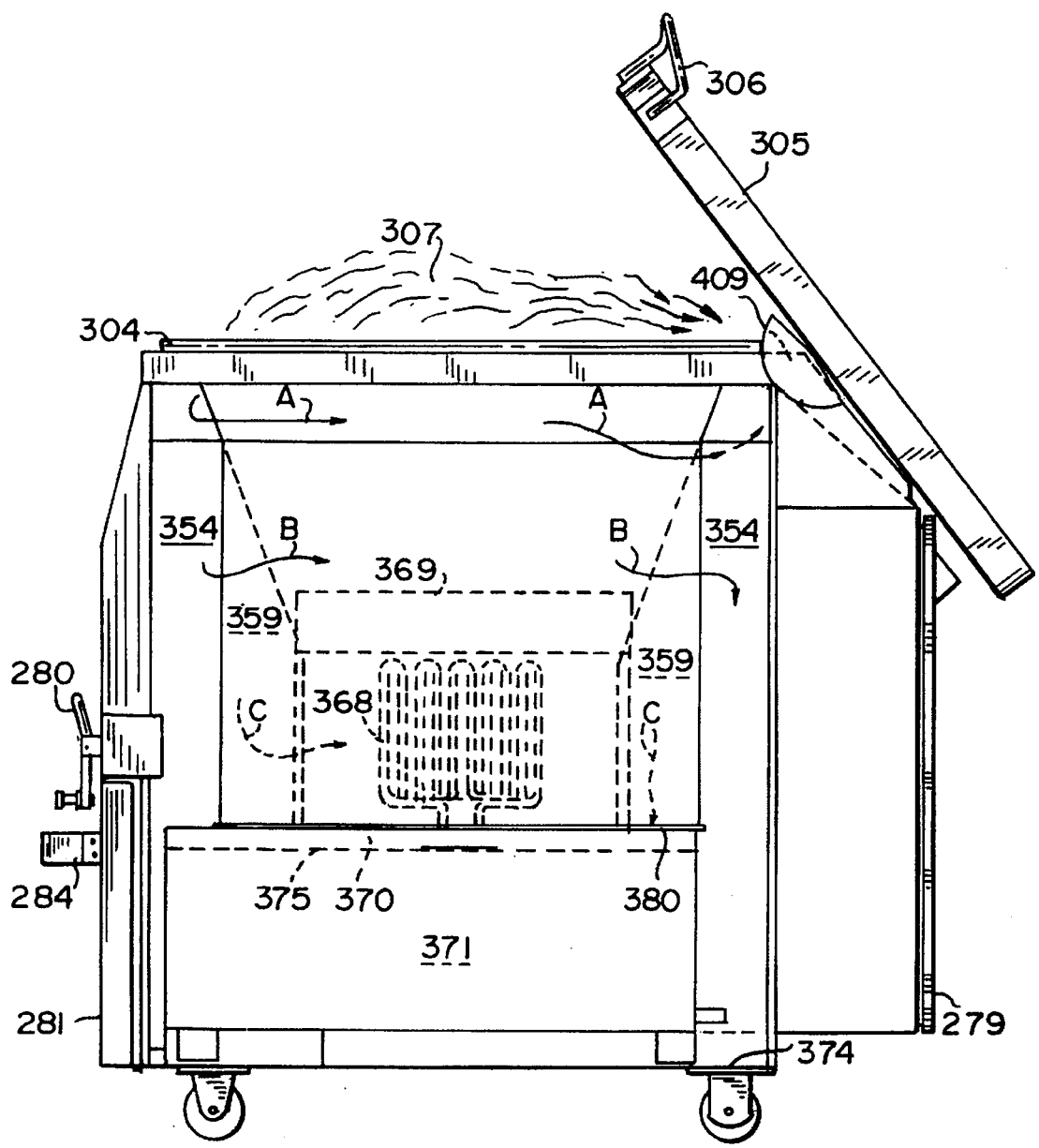
FIG. 16 is a sectional elevation taken along 15—15 in FIG. 14.
Figure 18:
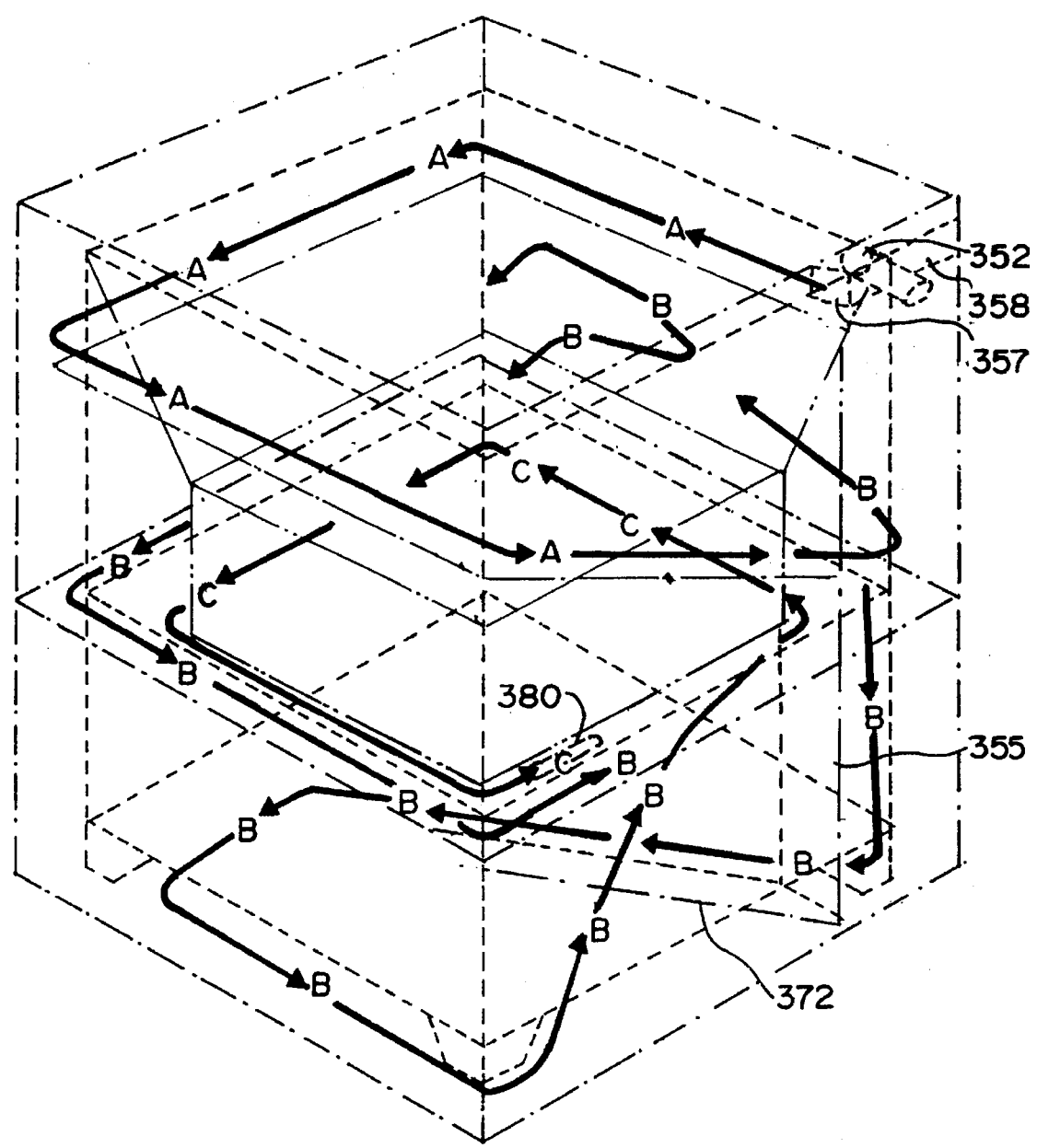
FIG. 18 is phantom view of the third embodiment including arrows that trace air flow through the apparatus.
Figure 19:
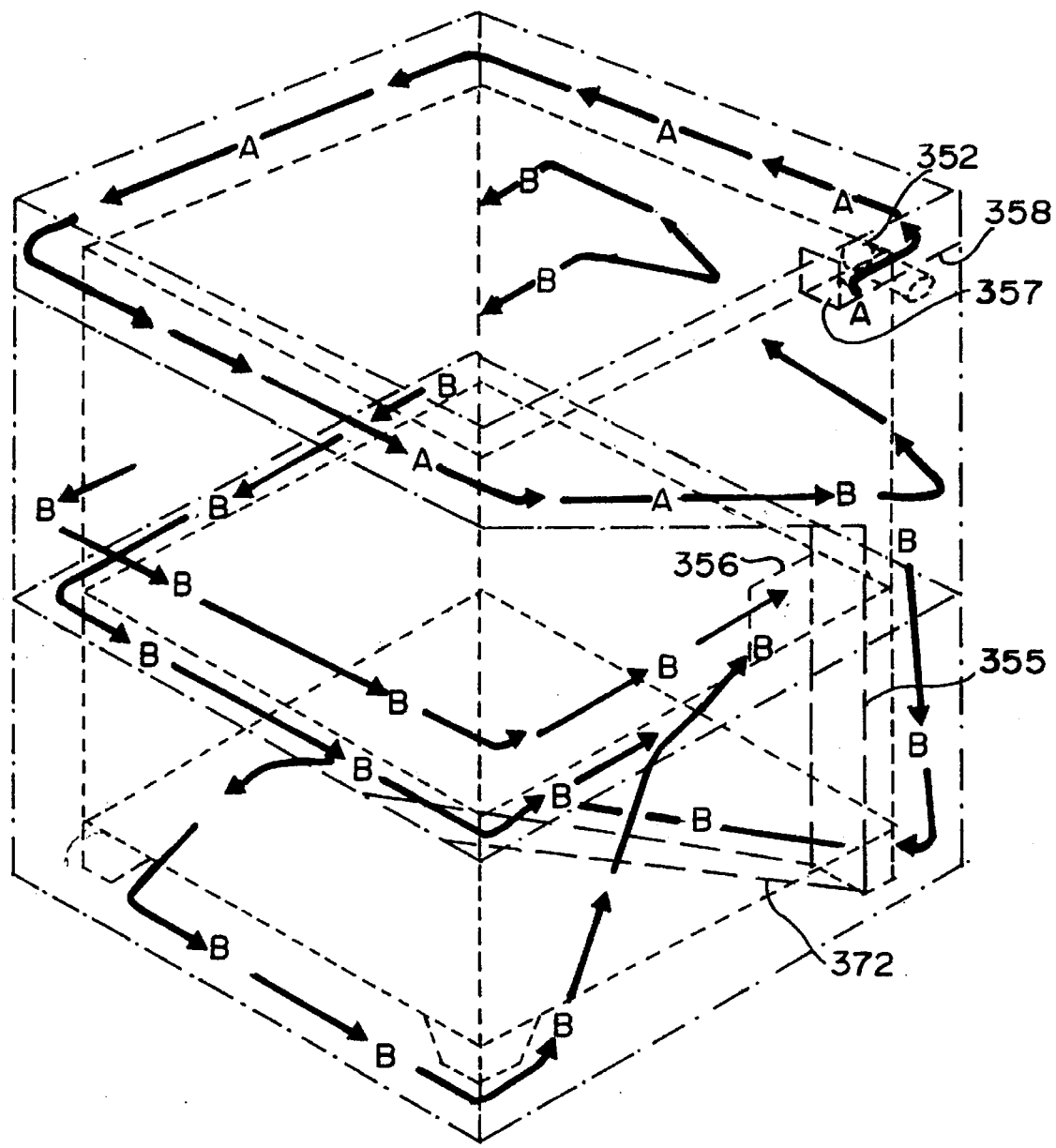
FIG. 19 is a second phantom view of the third embodiment shown without the cabinet.
Figure 20:
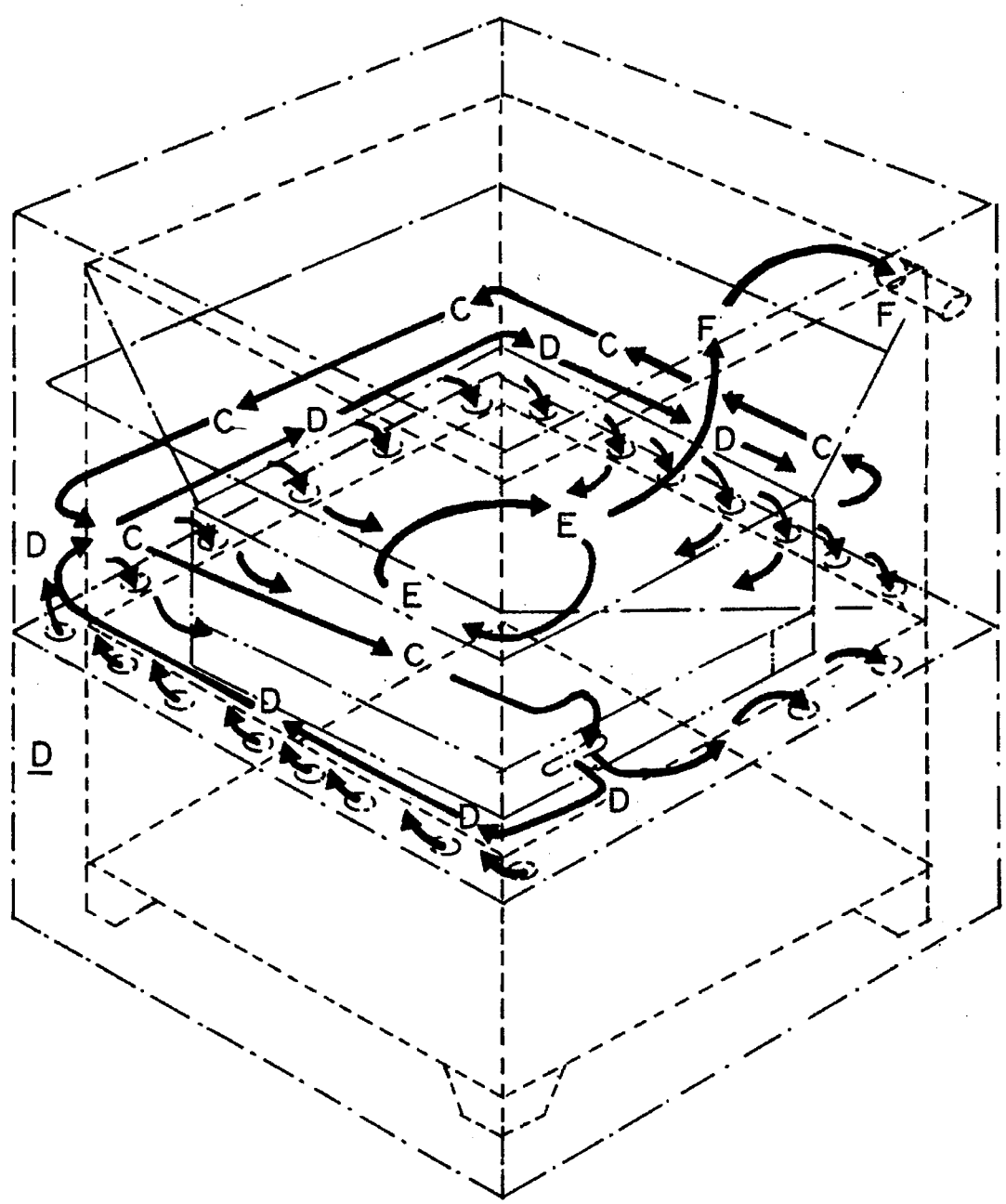
FIG. 20 is a third phantom view of the third embodiment showing the air flow from the air distribution plenum through the hopper and out of the unit.

The internal structure and novel convection heating system of this preferred embodiment will now be described in greater detail with reference to FIGS. 12 through 20. FIG. 14 is a sectional view of the apparatus taken along 14—14 in FIG. 12. FIG. 15 is a partial cutaway perspective view of the apparatus taken from the opposite front corner of that shown in FIG. 11. FIG. 16 is a sectional view taken along 16—16 in FIG. 14. FIG. 17 is a partial cutaway view of the apparatus taken from a side view. FIGS. 18 through 20 are schematic representations of the air flow through the apparatus which is shown in phantom. In each of these figures some elements may be omitted for the sake of clarity. However, all of the essential elements of the apparatus are shown.

Referring now to the preferred embodiment shown in FIGS. 12, 14, 15 and 18, outside air 330 is drawn by the forced-air inlet blower 285 through openings 331 in the controls/blower cabinet 278 and pushed into the apparatus. From the blower outlet shown schematically at 351, the outside air is directed into the upper section 350 of an air heat exchanging chamber by baffles 357, 358. At this point in the upper section 350 the incoming air flows across the exhaust pipe 404. The air moves in a counterclockwise direction around the circumference of the hopper upper section 361 as illustrated in FIG. 15 by arrows A. The air is preheated during this circuit by heat radiating from the upper section 361 of the hopper. This first air circuit around the apparatus is also schematically illustrated by arrows A in FIGS. 15 and 18.

Referring now to FIG. 14, as the air returns to the rear of the unit it is directed downward along the top of inclined baffle 353 to the lower section 354 of the air heat exchanging chamber. The air then makes a second circuit around the apparatus through the lower section 354 following the route illustrated by arrows B in FIGS. 15 and 18. This second circuit is quite extensive encompassing a volume that extends downwardly around the outside of upper heater chamber 359 (located adjacent to the hopper) and around the outside and bottom of the lower pan chamber 371. The circulating air is collected at the rear of the apparatus along the underside of inclined baffle 353 and vertical baffle 355. A floor baffle 372 (FIGS. 14, 16, and 18) extends vertically from the cabinet floor 374 to the underside of the lower pan chamber 371 and horizontally from the vertical baffle 355 towards the front of the apparatus. This baffle ensures that the air at the bottom of the apparatus must move from the rear to the front of the apparatus prior to entering port 356. In the lower section 354 the air absorbs and carries away heat radiating through the air heat exchange chamber inner walls 365 from the upper heaters 368 and from the pan box chamber 371.

The air moving through the upper and lower sections of the air heat exchanging chamber along with the insulating air space 362 between the cabinet side panel 303 and the air heat exchange chamber outer wall 364 serve two purposes. First, they reduce the amount of energy required to raise the air to a temperature effective for densification by preheating the air before it contacts the heating elements described below. Second, they eliminate the need for insulated side panels in the apparatus.

From the lower section 354 of the air heat exchange chamber the preheated air passes through port 356 and is guided by baffle 363 into the upper heater chamber 359. The upper heater chamber 359 is defined by the inner walls 365 of the air heat exchanger chamber and the hopper upper section walls 366. Baffle 363 directs the air through a sharp turn to the right and into direct contact with the upper heaters 368. A desirable serpentine coil heater for this application is the Model TRI-95XX, part number 393875658001 manufactured by the Chromalox Corporation.

In the upper heater chamber 359 the air makes a third circuit around the hopper (depicted by arrows C in FIG. 18) and is raised to a temperature effective for the thermal densification of thermoplastic articles. Upper heater baffles 369 are positioned between the upper heaters and the hopper walls 366, 367 to prevent the creation of hot spots opposite the heaters in the walls of the upper section 361 of the hopper. The upper heater baffles 369 distribute the radiant energy generated by the upper heaters 368 in a uniform fashion over a wide area. The hopper upper section 361 is heated by a combination of hot air circulation through the upper heater chamber 359, radiant heat from the upper heaters 368, and hot air rising from the hopper lower pan chamber 371.

The hot air exits the upper heater chamber 359 through exit port 380 (FIG. 18) located at the rear thereof. The temperature of the exiting air is monitored by sensors placed in or near the exit port 380. These probes are connected to the electronic control circuitry 282 for the purpose of cycling the upper heaters 368 on and off as needed to maintain the circulating air at a temperature effective for thermal densification. In this preferred embodiment, the air exiting the upper heater chamber 359 is maintained at about 149° C. to 232° C. (300° F. to 450° F.). Additional sensors may also be provided to operate a high temperature shut down or for maintenance/repair temperature monitoring.

From the upper heater chamber 359 the air passes through opening 380 (FIG. 18) and enters an air distribution plenum 370 located at the top of the lower pan chamber 371. The air distribution plenum 370 distributes the now hot air evenly over the thermoplastic articles in the lower pan chamber 371 through a plurality of openings in the bottom plate 375 of the plenum 370. The air contacts the articles in the lower pan chamber 371 and rises upwardly through the upper hopper section 361 contacting the articles contained therein (See FIG. 20). The air then exits the upper hopper chamber through exhaust port 352 (See FIG. 14) and into the exhaust pipe 404. The hot air causes the thermoplastic articles to shrink, collapse and collect into the removable pan 134 to form a solid block of densified material. Any moisture contained in the thermoplastic articles is driven off by the hot air and carried out of the apparatus.

Referring again to FIGS. 11 through 13 and 17, it can be seen that this embodiment employs a dilution air system which includes a separate external dilution air blower (not shown), an air sweep baffle 327, an air sweep chamber 328, exhaust chamber 405, exhaust duct 400 and exhaust duct baffle 403. The air sweep chamber 328 is defined as the space between the top of the controls/blower cabinet 278 and a cabinet cover 329. It should be noted that the air sweep chamber 328 is not an essential element of the dilution air system.

The routing of the dilution air is dependent on the position of the lid 305. When the lid 305 is closed, outside dilution air 336 is drawn into the air sweep chamber 328 through a plurality of angled intakes 408 in the cabinet cover located under the air sweep baffle 327. The baffle may be fitted with a spring 308 shown in FIG. 17 to hold it in position. As illustrated by arrows G in FIG. 13, the dilution air then travels across the air sweep chamber 328 and downwardly through entry port 406 into the exhaust chamber 405. Dilution air is pulled through the exhaust chamber 405 by the external blower at a significantly higher flow rate than that of the air exiting the hopper. In this preferred embodiment the separate external blower is a radial blade blower having a capacity of about 4,026 m³/h (2375 SCFM). The air flow through the exhaust pipe is about 59.5 to 76.5 m³/h (35 to 45 CFM). The dilution air cools the air exiting the hopper upper section 361 and condenses any moisture contained therein. As described herein above, the exhaust duct baffle 403 is in a vertical position when the lid 305 is closed so that air flow therethrough is restricted to the opening 410 in the baffle.

Returning to FIG. 16 it can be seen that the entry point into the apparatus for dilution air changes when the lid is opened. As the lid rotates to the open position, it contacts spring member 309 which is attached to the top of the air sweep baffle 327. The baffle 327 is thereby rotated so as to cover angled intakes 408 and expose horizontal intakes 409 (FIG. 16) located atop the air sweep chamber 328. The horizontal intakes 409 are located directly behind the gasket 304 along the rear of the unit. These horizontal intakes 409 are covered and not used when the lid is closed. Simultaneously, the linkage assembly 402 (FIG. 13) rotates the exhaust duct baffle 403 to a horizontal position within exhaust duct 400 substantially increasing its available cross-sectional area. The greatly increased air flow thereby created pulls odors/vapors 307 escaping from the hopper towards the rear of the unit away from the operator. The open lid acts as an exhaust hood to collect and direct the odors/vapors 307 through horizontal intakes 409 to the exhaust chamber 405 so that they can be removed from the apparatus.

Another function of the dilution air system in this preferred embodiment is to cool the exhaust pipe 407. Although the air in the exhaust pipe is much cooler than that in the warmest section of the interior of the apparatus, operation of the apparatus over several hours generates a great deal of heat in the exhaust chamber 405. The cool dilution air permits the exhaust pipe to be positioned within the apparatus without creating any hot-to-touch surfaces on the exterior thereof.

Although a preferred embodiment of an air dilution system has been described herein above, there exist alternative means to implement certain elements of the system. For example, a two-speed external fan could be used to create the increased air flow that is desirable when the lid 305 is opened. In such a configuration the fan would normally operate at a lower speed but would be switched to a high by a sensor that would detect the lid in an open position. Although it is believed that such an arrangement would not be as efficient as that in the preferred embodiment, use of such a fan could eliminate the need for the baffle pivotally mounted in the exhaust duct.

It should be understood that inter alia the dilution air system just described is intended to dilute the strength of food odors emanating from the apparatus during operation. Odor generation is a particular problem when the apparatus is used in commercial establishments in close proximity to customers. However, it is possible to install a bank of units in a remote central location to which thermoplastic articles may be transported. In such a remote setting, odor dilution can be eliminated and the exhausts from the bank of units may be vented to atmosphere. Accordingly, the dilution air system shown in the this preferred embodiment is not an essential element of the invention.

This third embodiment has advantages over those described above. The need for expensive insulative panels adjacent to the heated areas is greatly reduced in this embodiment. The lid 305 and the door 281 are the only two areas protected by insulated panels in this embodiment. The sides of the apparatus remain cool to touch as the heat generated inside the apparatus is carried away by the swirling circulating air flow. It is a characteristic of this embodiment that the thermal insulation of the apparatus is provided primarily by a combination of air space and circulating air flow.

A further advantage of the circulating air flow of the present invention is that the incoming air entering the upper heater chamber is preheated during its first two circuits around the circumference of the apparatus. Accordingly, the upper heaters 368 can raise the preheated air to a temperature effective for thermal densification utilizing less electrical energy because they cycle on with less frequency. Reducing the total on time also extends the life of the upper heaters 368.

Figure 7:
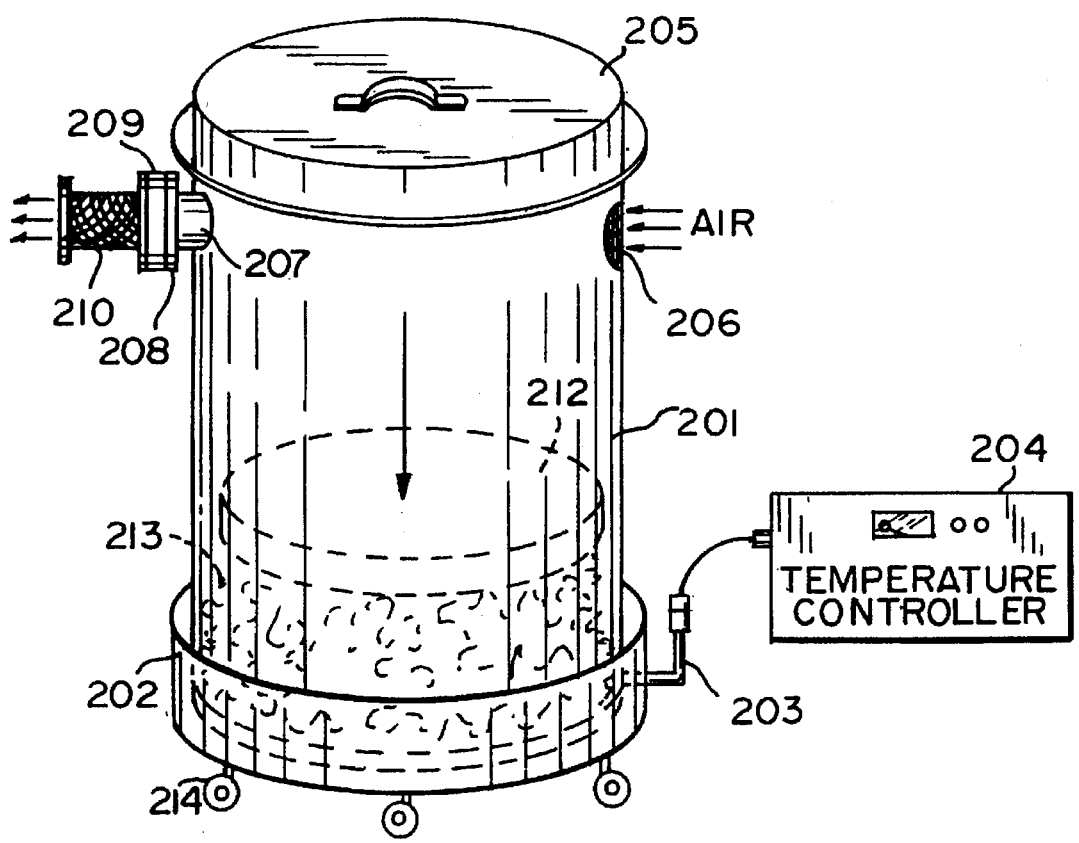
FIG. 7 is a view in perspective of an alternate embodiment of a thermal densification apparatus according to the present invention.

Referring now to FIG. 7, an alternate embodiment of a thermal densification apparatus of a type useful in a commercial establishment is depicted. The apparatus consists of a container 201 for placing thermoplastic articles 213 therein, the container also having a cover 205. Heating for the thermal densification process is provided by heating unit 202, which may be of the electrical resistance type or any other type capable of heating the contents of the container to a temperature effective for the thermal densification of thermoplastic articles 213. A type of electrical heating unit which has been demonstrated to have utility in this application is one commercially marketed by McMaster-Carr of Chicago, Ill. and sold as an drum platform heater. Preferred is such a heating unit having a power rating of about 1500 watts which operates on 115 volts or 230 volts AC. As may be envisioned, this type of heating unit provides heating of container 201 mainly from the container bottom, which is the manner of heating particularly preferred. As is known to those skilled in the art, it would be difficult to heat in from the sides of container 201, as opposed to heating from the bottom, due to the insulative value of the thermoplastic articles to be densified. Moreover, side heating may complicate cleanup of container 201 following use. The platform heater can also be used in conjunction with a circumferential band heater. Such heaters are also marketed by McMaster-Carr of Chicago, Ill. When used with the platform heater, the band heater is placed around container 201 at its bottom. A preferred band heater is one having a power rating of about 750 watts which operates on 115 volts or 230 volts. Temperature sensor 203 is provided for monitoring the outer surface temperature of container 201. Although an outer surface temperature monitoring arrangement is depicted, it is known that other arrangements, such as an inner surface monitoring arrangement, would produce entirely acceptable results. The output of temperature sensor 203 is fed into temperature controller 204, creating a temperature feedback loop assuring that the heating provided is of a level capable for effective thermoplastic thermal densification, but not so high as to chemically decompose or ignite the contents of container 201. Controller 204 can be of the adjustable variety, permitting the safe and effective thermal densification of a wide variety of thermoplastic materials.

Again, the temperature used for the process of the present invention will generally be one which is at least effective for the thermal densification of the thermoplastic articles 213 placed within container 201. While this will generally be a temperature of at least about 250° F., (usually about 300° F. to about 350° F.), it is preferred that the temperature does not exceed a value which would alter the molecular weight of the thermoplastic articles by an amount exceeding 50% of their original molecular weight. In no case should the temperature selected be one which produces thermal ignition of the thermoplastic material.

To minimize process energy requirements, insulation (not shown) may be advantageously utilized on the outer surface of container 201. To further assist in the thermal densification process, vented plate or screen 212 can optionally be provided. Vented plate 212 serves two purposes, the first being to exert a downward force on the thermoplastic articles undergoing the densification process, keeping them in intimate contact with the hot inner surface of container 201 and the pool or slurry of already densified thermoplastic material, the second purpose is to reduce system heat loss. The material selected for plate 212 should be one able to withstand process temperatures. As such, iron, steel and stainless steel are preferred materials, with stainless steel and stainless steel screen particularly preferred. When screen material is utilized a frame may be required to hold such material. Such a frame should be of a weight sufficient to achieve the first purpose stated above. If an expanded metal screen is utilized, no frame may be required due to the rigidity and weight normally possessed by such material.

To prevent the build-up of fumes within the apparatus during use, a fan assisted, flow-through ventilation system is provided in a preferred embodiment of the present invention. This system consists in its essential elements of screened inlet 206, and diametrically opposed outlet duct 207. Outlet duct 207 is shown in FIG. 7 as having a flange 208 for the mounting of exhaust fan 209 thereon. Mounted to the flange of exhaust fan 209 is filter element 210. Filter element 210 can be of the paper-type, activated charcoal-type, or the like. It is also within the scope of the present invention to provide an inert gas ventilation system (not shown), rather than a fan-assist ventilation system. Pressurized nitrogen can be effectively used in this regard. The use of inert gas can provide an additional measure of safety in the practice of the process of this invention. Also, casters 214 can be provided to facilitate movement of the apparatus.

As may be envisioned, the apparatus depicted in FIG. 7 will find utility in fast food restaurants, where the densification and recycling of polystyrene foam is a chief concern; at grocery stores, where the densification and recycling of thermoplastic grocery sacks and other plastics is desired; and, aboard ships where the disposal of thermoplastic waste at sea is becoming an ever-increasing concern among environmentalists. At most, only minor modifications to the basic apparatus would be required to adapt the thermal densification unit of the present invention to one of these applications.

Figure 8:
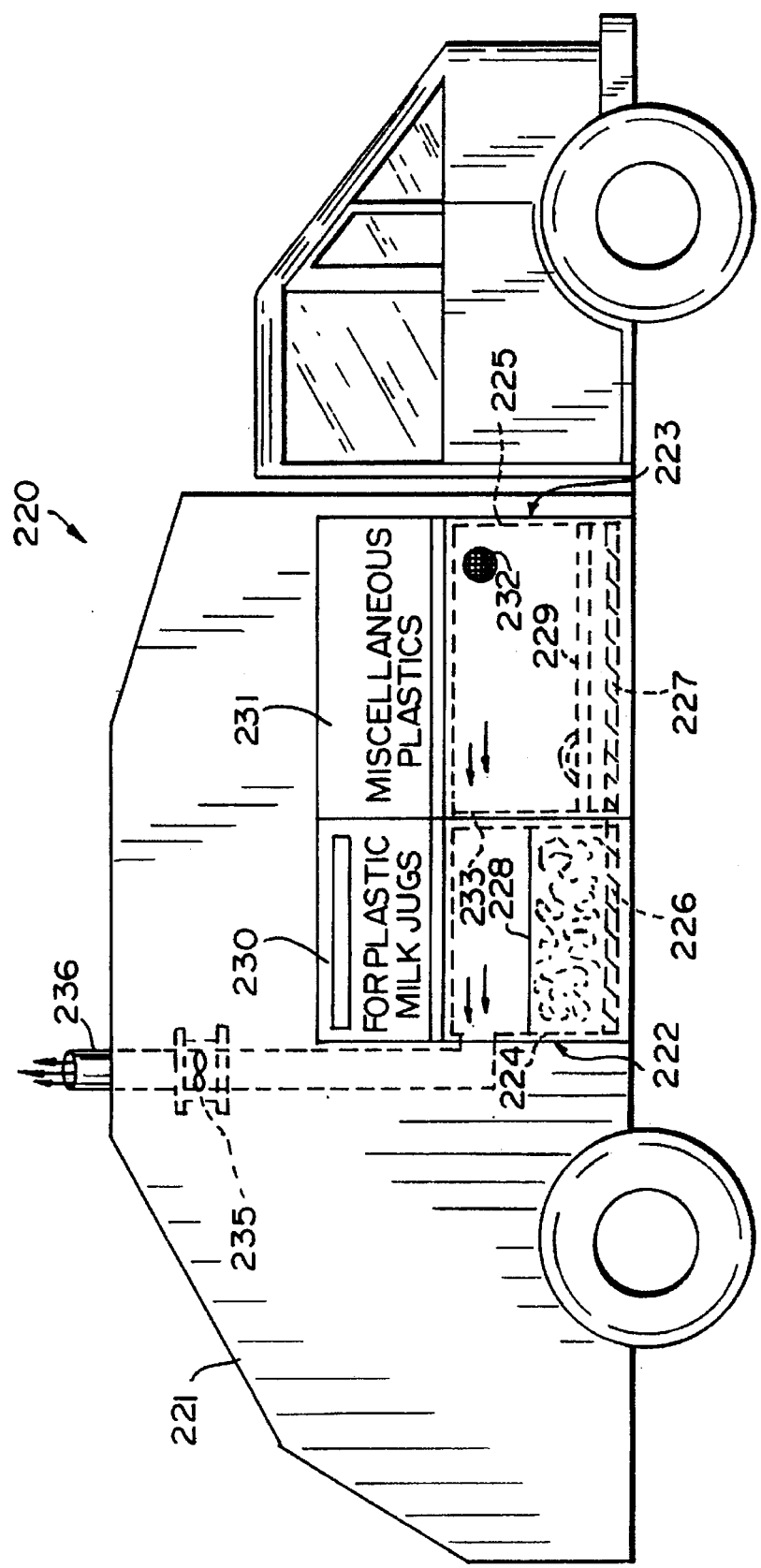
FIG. 8 is a side view of a refuse collection vehicle having two thermal densification systems installed therein.

When adapted for use in a refuse collection vehicle, the thermal densification apparatus of FIG. 7 will generally differ only in that it will be configured for housing within a separate compartment of the body of that vehicle and be capable of mobile operation. An example of such an embodiment is depicted in FIG. 8. As shown in FIG. 8, the body 221 of refuse collection vehicle 220 is equipped with two segregated thermal densification units 222 and 223. The two units are provided for the purpose of thermoplastic segregation. For example, as indicated in FIG. 8, thermal densification unit 222 is dedicated to increasing the bulk density of plastic milk jugs and like material containers, which are generally produced from HDPE, while thermal densification unit 223 is used for the densification of miscellaneous thermoplastics. Inserted within the body compartments of body 221 are removable containers 224 and 225 which are mounted upon separate heating elements 226 and 227. Heating elements 226 and 227 can advantageously be controlled by separate controllers using separate temperature sensing means (not shown) similar to those previously described. Such an arrangement would permit the tailoring of separate thermal densification units to the materials sought to be densified by each. Of course, such electrical equipment would have to be adapted to mobile use, which could be accomplished through the use of an AC to DC inverter, as those skilled in the art would clearly recognize.

Each unit is also shown equipped with vented plates 228 and 229 which serve to place a downward force on the material to be densified while also assisting in system heat retention. Vented plates 228 and 229 are shaped to essentially conform to the shape of containers 224 and 225 and may also be equipped with handles to aid in the use thereof. As with the thermal compaction unit of FIG. 7, vented plates 228 and 229 may also be constructed of a screen material so long as the resultant elements achieve the purpose of exerting a downward force on the thermoplastic articles. Each body compartment is shown having a hinged door (230 and 231), which can be closed when the vehicle is travelling from one pick-up site to another. Door 230 is shown in the opened position.

Figure 9:
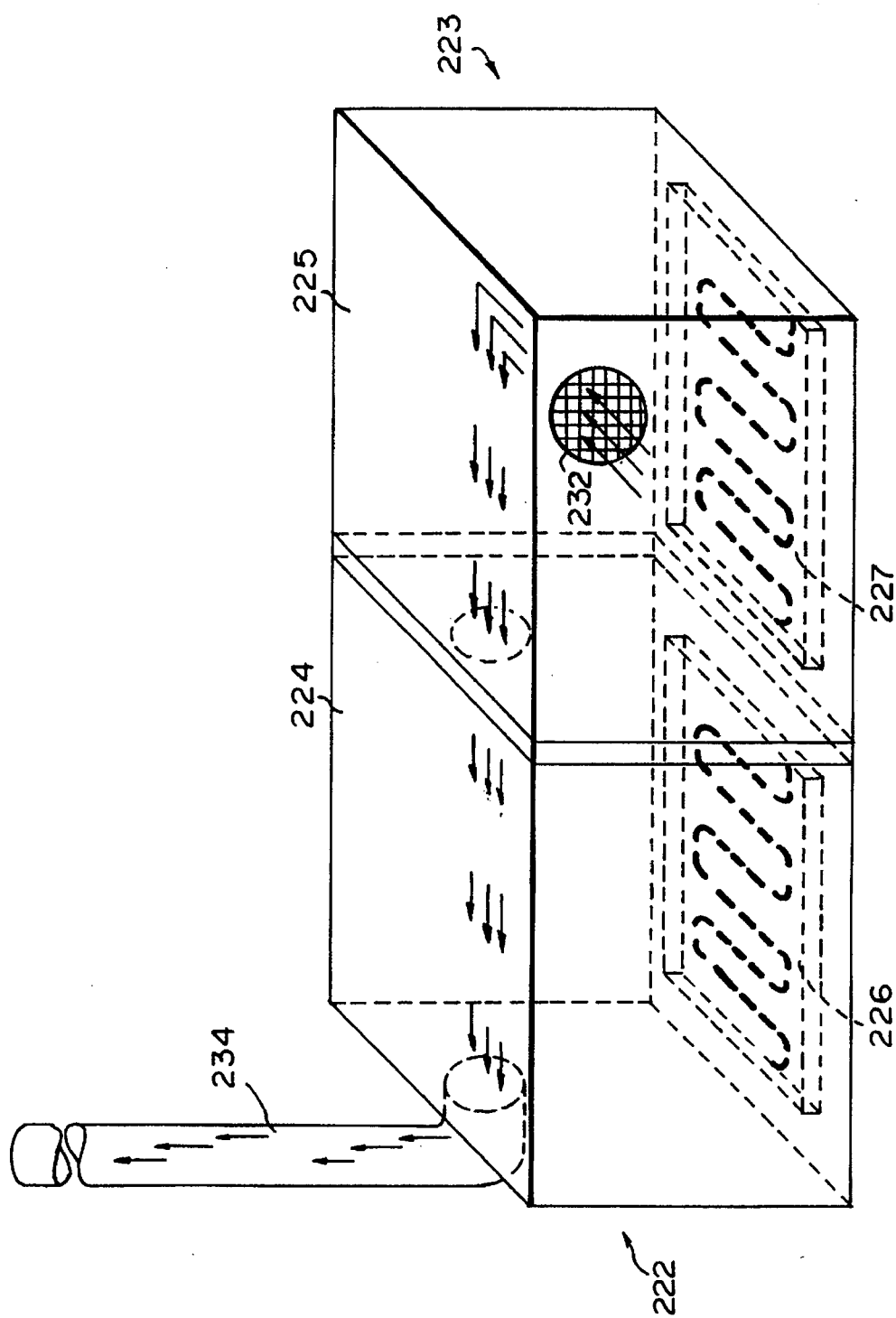
FIG. 9 is an enlarged view in perspective of a portion of the two thermal densification systems of the refuse collection vehicle.

The thermal compaction units of the vehicle shown in FIG. 8 are provided with a cross-flow ventilation system to prevent the build up of fumes within the units. As indicated, a single system can be utilized to ventilate both thermal compaction units. The system shown provides a screened air inlet vent 232, a co-communication path 233, between containers 224 and 225 exhaust pipe section 234, fan 235 and atmospheric duct 236. Further clarification regarding the details of this arrangement may be obtained by referring to FIG. 9 which provides an enlarged perspective view of key thermal densification system elements including removable containers 224 and 225, heating elements 226 and 227, as well as the ventilation system just described.

As may be envisioned, the present invention will find utility in fast-food restaurants, where the densification and recycling of polystyrene foam is a chief concern; at grocery stores, distribution centers and warehouses for the densification of thermoplastic packaging and containers; in fabricating facilities utilizing thermoplastic materials; aboard ships where the disposal of thermoplastic waste at sea is becoming an ever-increasing concern; and elsewhere. At most, only minor modifications to the basic apparatus would be required to adapt the present invention to any of these applications.

When segregated plastic densification is to be practiced, it may be advantageous to place the relevant SPI (The Society of the Plastics Industry) recycling code upon the resultant resin block to aid in recycling. This can be accomplished by placing a metal die plate at the bottom of the container prior to densification. Upon cooling the molten material, the SPI code will be imprinted on the block. This procedure can also be utilized with any embodiment of the present invention.

The following example further illustrates the essential features of the apparatus and method of the present invention. As will be apparent to those skilled in the art, the conditions used in the example are not meant to limit the scope of the invention.

Example 1

This example demonstrates the ability of the apparatus and method of the present invention to effectively increase the bulk density of thermoplastic material, in particular, polystyrene foam articles.

A thermal densification unit of the type shown in FIGS. 4 through 6, having an interior volume of approximately 40 gallons, was designed and fabricated. The unit was constructed of cold rolled and galvanized steel. The heating system had a total capacity of 8000 watts, using commercially available heating elements. A thermocouple was located as shown in FIG. 6, the output of which was connected to the input of a commercially available temperature controller. Fiberglass insulation was employed.

To demonstrate the effectiveness of the unit at handling an average day's plastic waste for a typical, high volume fast-food restaurant, ten, 30-gallon bags of polystyrene foam containers (1000 containers) were obtained. Such containers are produced by, and available from, Mobil Chemical Co. of Canandaigua, N.Y. The controller of the unit's heater was set to provide a temperature of about 300° F. at the location of the thermocouple. The containers were dumped into the unit at the rate of one 30-gallon bag (100 containers) every 5–10 minutes until all 10 bags of containers had been put into the apparatus. The resultant block of polystyrene melt was then permitted to cool and solidify. The cooled material shrank away from the walls of the removable pan allowing easy removal from the pan.

The cooled thermoplastic block had a volume of 0.296 ft$^3$ and weighed approximately 12 pounds. Since the average closed, hinged-lid container, prior to the thermal densification process of the present invention had an average bulk density of approximately 0.25 lbs./ft$^3$, it can be seen that the very significant densification was obtained. The bulk density of the resultant block was approximately 40.6 lbs/ft$^3$.

As may be envisioned, if the typical fast-food restaurant generates 10–12 pounds of thermoplastic waste per day, a thermal densification unit of the type used in the above example can easily handle such waste in a period of approximately one to one and a half hours, with the store personnel only required to turn on the apparatus, load it, shut it off and remove the densified material from the pan. Only a few additional minutes are required each day to operate the densifier. The unit can be turned off overnight, which will permit the block of plastic to solidify for removal the next morning. The blocks so produced can be easily stored on site for pickup by a recycler, or returned to a central location by an unloaded supply truck making routine deliveries to the commercial location equipped with a thermal densification unit of the present invention.

Example 2

This example demonstrates the ability of an alternate embodiment of the apparatus and method of the present invention to effectively increase the bulk density of thermoplastic material.

A thermal densification unit of the type shown in FIG. 7, having an interior volume of approximately 40 gallons, was designed and fabricated. The container employed was cylindrical, having an internal diameter of approximately 20 inches, and constructed of stainless steel. The container was fitted with a cover, also of stainless steel. Such a container is available from McMaster-Carr of Chicago, Ill. The heater was a conventional resistance-type drum platform heater, such a heater being available from McMaster-Carr of Chicago, Ill. A thermocouple was affixed to the outer skin of the container, near its base, the output of which was connected to the input of the controller. The exterior surface of the container was insulated. The unit built for this example had no ventilation system.

To demonstrate the effectiveness of the unit at handling an average day's plastic waste for a typical, high volume fast food restaurant, 10, 30-gallon bags of polystyrene foam cartons (1000 cartons) were obtained. Such cartons are produced by and available from Mobil Chemical Co. of Greenwich, Conn. The controller of the unit's heater was set to provide a temperature of about 400° F. at the inner surface of the container. The cartons were dumped into the stainless steel container at the rate of one 30-gallon bag (100 cartons) every 15–20 minutes until all 10 bags of cartons had been dumped into the container. The resultant pool of polystyrene melt was then cooled and solidified. In cooling the material for removal from the container, the following process was used: a) turn off the heat, b) cover the material with water to a 6 inch depth, and c) allow material to sit under water until cool. The cooled material shrank away from the walls of the container, released and floated to the surface for easy removal from the container.

The cooled disk measured 20 inches in diameter and was 1½ to 1¾ inches thick. The disk weighed approximately 12 pounds. Since the average carton, prior to the thermal densification process of the present invention had an average bulk density of approximately 0.25 lbs./ft$^3$, it can be seen that the very significant densification was obtained, since the bulk density of the resultant disk was on the order of approximately 40.6 lbs/ft$^3$.

As may be envisioned, if the typical fast food restaurant generates 10–12 pounds of thermoplastic waste per day, a thermal densification unit of the type used in the instant example can easily handle such waste in a period of approximately 2½ hours, with the only involvement from store personnel being the loading of the unit, such loading requiring less than about a minute per bag. The unit can be turned off overnight, which will permit the pool of plastic to solidify for removal the next morning. The disks so produced can be easily stored on site for pick-up by a recycler, or returned to a central location by an unloaded supply truck making routine deliveries to the commercial location equipped with the thermal densification unit of the present invention.

Example 3

This example illustrates the ability of the apparatus and method of the present invention to effectively increase the bulk density of polyethylene bottles after use.

For this example, a bench top laboratory apparatus was configured utilizing a conventional hot plate with temperature controller, an insulated stainless steel beaker of a size capable of containing a one-gallon milk bottle prior to densification, a thermocouple and a pyrometer. The thermocouple was located on the outside surface of the beaker, near its bottom. The hot plate was set to control the temperature of the beaker to approximately 400° F.

Polyethylene milk bottles having an initial bulk density of approximately 0.08 lbs/ft$^3$ were introduced one at a time into the laboratory densification apparatus. Space constraints necessitated this manner of introduction. A total of 8 one-gallon bottles were densified in this manner with the resultant pool permitted to cool and solidify. The resultant block of material was weighed and found to have a bulk density of about 12 lbs/ft$^3$, equating to a volumetric densification on the order of 150 times original density.

When the process of the present invention is to be practiced aboard a ship, recycling of densified material may not be practical and disposal at sea still desired. To assure that the densified material does not float, it may be necessary to increase its specific gravity. To accomplish this, material of higher specific gravity can be added to the molten thermoplastic prior to cooling. Lead shot and the like an be utilized for this purpose.

While the apparatus of the present invention has been described as having utility primarily at commercial facilities, aboard ships and in refuse collection vehicles, other applications are within the scope of this invention. For example, envisioned is a unit sized and equipped for household use. Such units would have particular utility in locations where refuse trucks of the type incorporating the apparatus of the present invention were not available.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. An apparatus for the batch thermal densification of thermoplastic articles, comprising:
   a) a thermally insulated closeable cabinet including a top access with a lid for loading thermoplastic articles and a lower access for the removal of densified thermoplastic material;
   b) a hopper mounted within the cabinet, the hopper comprised of:
      i) an upper section;
      ii) a lower pan chamber having a top and a bottom, the lower pan chamber being in communication with the upper section and the access, wherein the lower pan chamber contains a separate front access; and
      iii) an air distribution plenum located at the top of the lower pan chamber;
   c) a convection heating system comprising:
      i) an air heat exchange chamber having an upper section and a lower section and positioned between the cabinet and the hopper wherein the air heat exchange chamber is adapted to create a circulating air flow around the hopper;
      ii) an upper heater chamber adjacent to the hopper and in communication with the air heat exchange chamber, the upper heater chamber being adapted to create a circulating air flow around the hopper and into the air distribution plenum;
      iii) a heater in the heater chamber adapted to heat the circulating air flow to a temperature effective for the thermal densification of thermoplastic articles in the hopper; and
      iv) an air temperature control responsive to a temperature sensor located in the upper heater chamber, wherein the air temperature control and the means for heating cooperate to maintain the upper heater chamber circulating air flow at a temperature effective for the thermal densification of thermoplastic articles;
   g) a removable pan located in the lower pan chamber for collecting densified thermoplastic material; and
   h) a pan heater system adapted to maintain the pan at a temperature suitable for the even filling of the pan with densified thermoplastic material responsive to a pan temperature sensor.

2. The apparatus of claim 1 wherein the means for heating the circulating air comprises at least one electrical resistance heater.

3. The apparatus of claim 2 wherein the means for heating the circulating air is adapted to maintain the circulating air within a range of about 149° C. to 232° C.

4. The apparatus of claim 3 further comprising an exhaust air dilution system comprising:
   a) at least one set of dilution air inlets;
   b) an exhaust chamber in communication with the at least one set of dilution air inlets;
   e) a dilution air fan connected to the exhaust duct; and
   f) means for increasing air flow through the dilution air system when the top access is opened.

5. The apparatus of claim 4 wherein the means for increasing air flow comprises:
   a) an exhaust duct in communication with the exhaust chamber and located upstream of the dilution air fan;
   b) an exhaust duct baffle pivotally mounted within the exhaust duct, wherein the exhaust duct baffle contains an opening therethrough; and
   c) means for pivoting the exhaust duct baffle within the exhaust duct when the top access is opened.

6. The apparatus of claim 5 wherein the means for pivoting is a linkage assembly connected at an upper end to a guide hinge member and at a lower end to the exhaust duct baffle.

7. The apparatus of claim 6 further comprising a means for indicating that the pan is full of densified thermoplastic material.

8. The apparatus of claim 1, wherein the temperature effective for thermal densification renders food remains present in or on the thermoplastic articles bacterially inert.

* * * * *